United States Patent
Watanabe et al.

(10) Patent No.: US 11,538,475 B2
(45) Date of Patent: Dec. 27, 2022

(54) INFORMATION PROCESSING APPARATUS AND INFORMATION PROCESSING METHOD

(71) Applicant: KABUSHIKI KAISHA TOSHIBA, Minato-ku (JP)

(72) Inventors: Nayuko Watanabe, Kawasaki (JP); Hiroshi Fujimura, Yokohama (JP); Toshiaki Nakasu, Chofu (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 200 days.

(21) Appl. No.: 17/007,413

(22) Filed: Aug. 31, 2020

(65) Prior Publication Data
US 2021/0174799 A1     Jun. 10, 2021

(30) Foreign Application Priority Data
Dec. 4, 2019   (JP) .............................. JP2019-219591

(51) Int. Cl.
| | |
|---|---|
| *G10L 15/22* | (2006.01) |
| *G10L 15/26* | (2006.01) |
| *G10L 15/30* | (2013.01) |
| *G06V 10/40* | (2022.01) |
| *G06V 30/10* | (2022.01) |

(52) U.S. Cl.
CPC .............. *G10L 15/22* (2013.01); *G06V 10/40* (2022.01); *G10L 15/26* (2013.01); *G10L 15/30* (2013.01); *G06V 30/10* (2022.01); *G10L 2015/223* (2013.01)

(58) Field of Classification Search
CPC .......... G10L 15/22; G10L 15/26; G10L 15/30
See application file for complete search history.

(56) References Cited

U.S. PATENT DOCUMENTS

| | | | | |
|---|---|---|---|---|
| 5,894,306 | A * | 4/1999 | Ichimura | ............... G06F 3/0488 |
| | | | | 345/418 |
| 10,572,812 | B2 | 2/2020 | Nasu | |
| 11,172,082 | B2 * | 11/2021 | Yoshimi | ............... G06F 3/1205 |

FOREIGN PATENT DOCUMENTS

| | | |
|---|---|---|
| JP | 2000-132561 A | 5/2000 |
| JP | 2015-184487 A | 10/2015 |
| JP | 2016-058112 A | 4/2016 |
| JP | 2016-177474 A | 10/2016 |
| JP | 6596373 B2 | 10/2019 |

\* cited by examiner

*Primary Examiner* — Ibrahim Siddo
(74) *Attorney, Agent, or Firm* — Oblon, McClelland, Maier & Neustadt, L.L.P.

(57) ABSTRACT

According to one embodiment, an information processing apparatus includes an acquisition unit, a conversion unit, and a display controller. The acquisition unit acquires multimedia data associated with an item of record data having a plurality of items. The conversion unit performs a conversion process from the multimedia data to first display data showing a content of the multimedia data. The display controller displays the first display data when the conversion process is completed, and displays second display data showing a progress status of the conversion process when the conversion process is incomplete in association with the item of the record data.

11 Claims, 18 Drawing Sheets

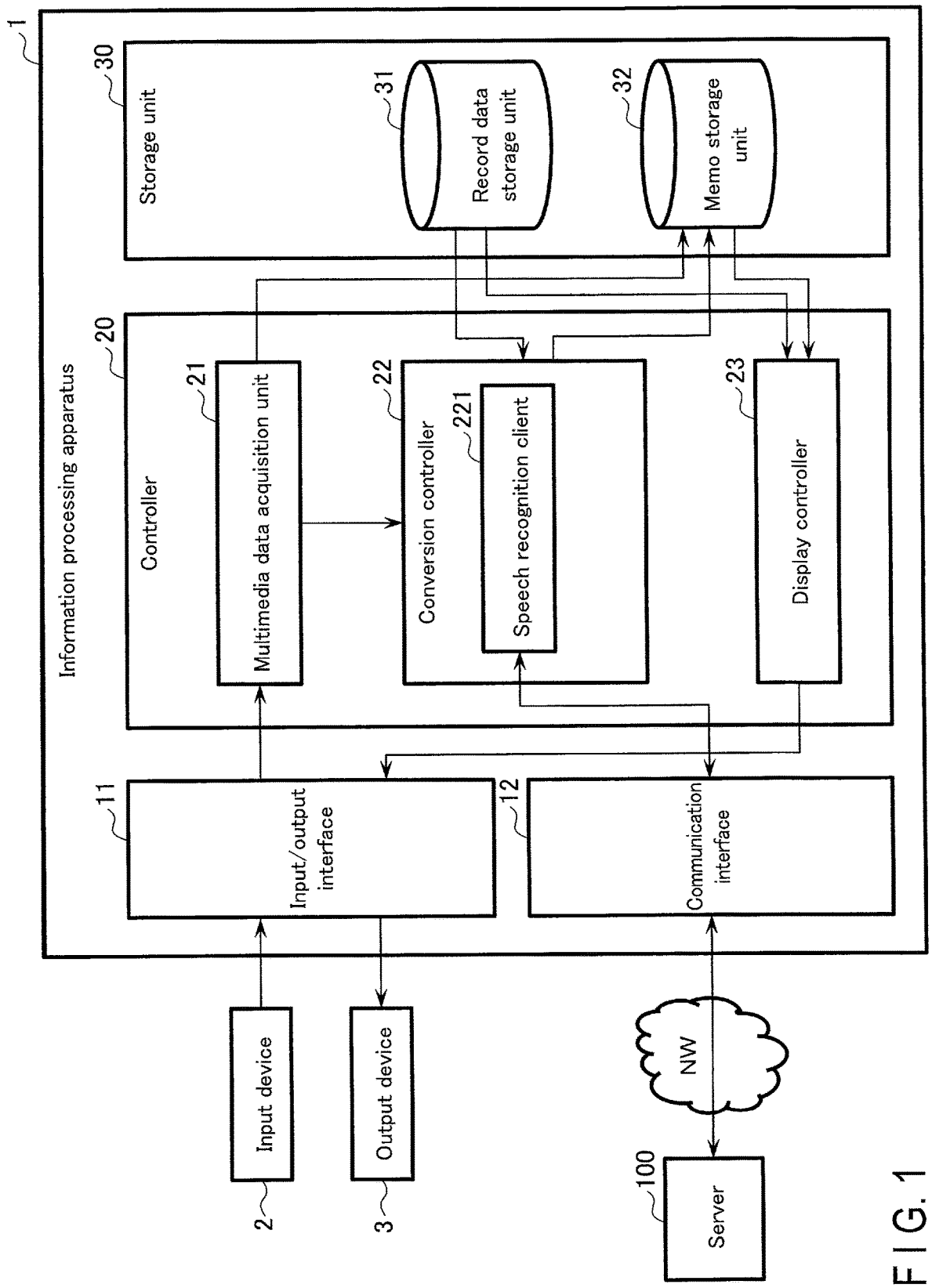
F I G. 1

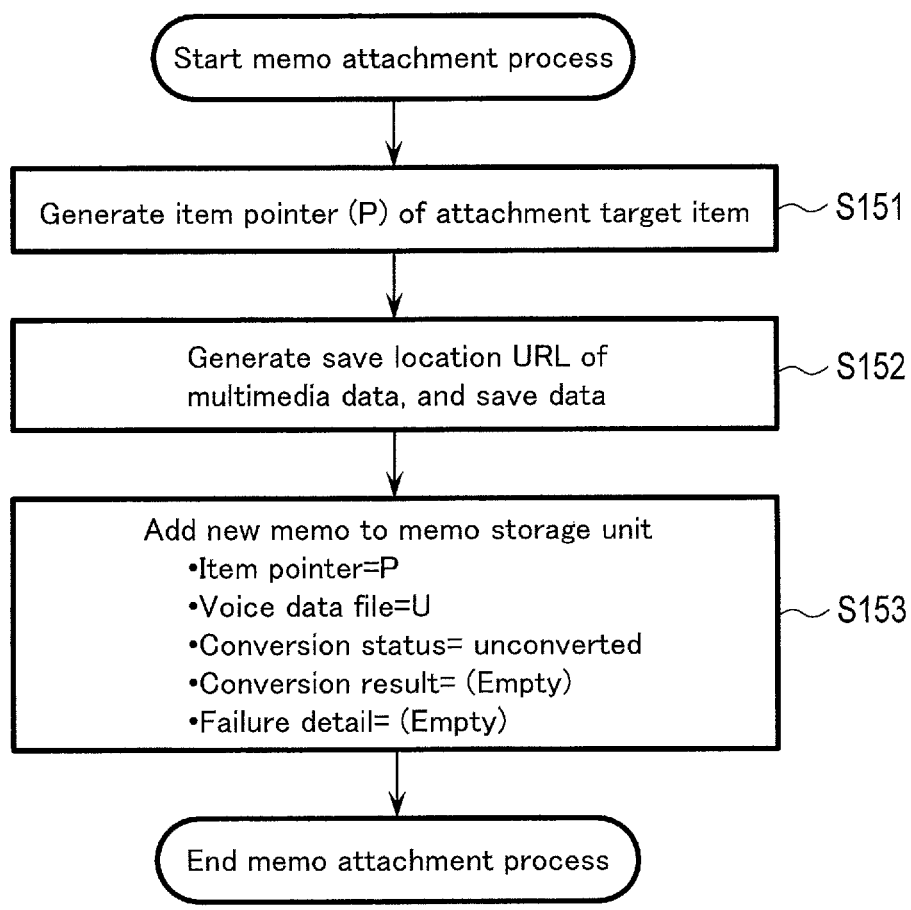
F I G. 4

|  | CL1 | CL2 | CL3 | CL4 | CL5 | CL6 | CL7 |
|---|---|---|---|---|---|---|---|
| RW1 | No. | Test item | Measurement value | | | Unit | Judgement (good/bad) |
| | | | R | S | T | | |
| RW2 | 1 | Minimum actual current 1 | 3.91 | 4.05 | 4.12 | A | Good |
| RW3 | 2 | Minimum actual current 2 | | | | A | |
| RW4 | 3 | Ramp time | | | | sec | |
| RW5 | 4 | Sync phase angle | | | | Lead(°) | |

| Item pointer | Voice data file | Conversion status | Conversion result | Failure detail |
|---|---|---|---|---|
| (2,7) | 201908211030421_0.wav | Converted | Abnormal noise during measurement | |
| (3,1)-(3,7) | 201908211132465_0.wav | Conversion failed | | No network connection |
| (4,3)-(4,5) | 201908211145052_0.wav | Converting | | |
| (4,7) | 201908211153951_0.wav | Unconverted | | |

|  | CL1 | CL2 | CL3 | CL4 | CL5 | CL6 | CL7 |
|---|---|---|---|---|---|---|---|
| RW1 | No. | Test item | Measurement value | | | Unit | Judgement (good/bad) |
| | | | R | S | T | | |
| RW2 | 1 | Minimum actual current 1 | 3.91 | 4.05 | 4.12 | A | Good |
| RW3 | 2 | Minimum actual current 2 | 24.6 | 25.4 | 25.2 | A | Good |
| RW4 | 3 | Ramp time | 0.347 | 0.294 | 0.401 | sec | Good |
| RW5 | 4 | Sync phase angle | 115.2 | | | Lead(°) | Good |

61a  08/21 10:30  2-Judgement  ▸Abnormal noise during measurement
61b  08/21 11:32  3  ▸Failed recognition (no network connection)
61c  08/21 11:45  4-Measurement value  ▸🕒 (Recognizing)
61d  08/21 11:53  4-Judgement  ▸(Waiting recognition)
     611          612                 613    614

08/21 11:53 4-Judgement X
631
632 633 634
63
61

FIG. 9

|  | CL1 | CL2 | CL3 | CL4 | CL5 | CL6 | CL7 |
|---|---|---|---|---|---|---|---|
| RW1 | No. | Test item | Measurement value | | | Unit | Judgement (good/bad) |
| | | | R | S | T | | |
| RW2 | 1 | Minimum actual current 1 | 3.91 | 4.05 | 4.12 | A | Good *1 |
| RW3 | 2 | Minimum actual current 2 | 24.6 | 25.4 | 25.2 | A | Good |
| RW4 | 3 *2 | Ramp time | 0.347 | 0.294 | 0.401 | sec | Good |
| RW5 | 4 | Sync phase angle | | 115.2 *3 | | Lead(°) | Good *4 |

61a — *1  08/21 10:30 ▶ Abnormal noise during measurement
61b — *2  08/21 11:32 ▶ Failed recognition (no network connection)
61c — *3  08/21 11:45 ▶ ⏱ (Recognizing)
61d — *4  08/21 11:53 ▶ (Waiting recognition)
615

F I G. 10A

|  | CL1 | CL2 | CL3 | CL4 | CL5 | CL6 | CL7 |
|---|---|---|---|---|---|---|---|
| RW1 | No. | Test item | Measurement value | | | Unit | Judgement (good/bad) |
| | | | R | S | T | | |
| RW2 | 1 | Minimum actual current 1 | 3.91 | 4.05 | 4.12 | A | Good |
| RW3 | 2 | Minimum actual current 2 | 24.6 | 25.4 | 25.2 | A | Good |
| RW4 | 3 | Ramp time | 0.347 | 0.294 | 0.401 | sec | Good |
| RW5 | 4 | Sync phase angle | | 115.2 | | Lead(°) | Good |

61a — 08/21 10:30 ▶ Abnormal noise during measurement
61b — 08/21 11:32 ▶ Failed recognition (no network connection)
61c — 08/21 11:45 ▶ ⏱ (Recognizing)
61d — 08/21 11:53 ▶ (Waiting recognition)

F I G. 10B

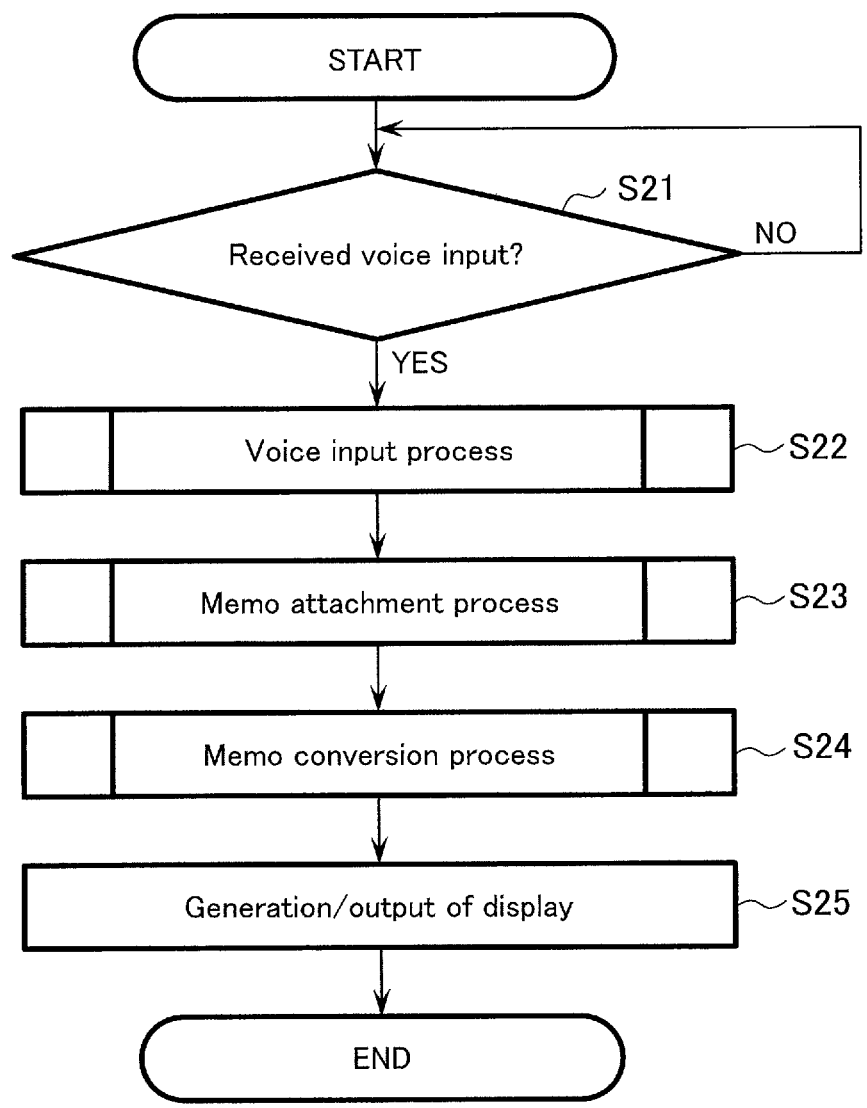
F I G. 12

INFORMATION PROCESSING APPARATUS AND INFORMATION PROCESSING METHOD

CROSS-REFERENCE TO RELATED APPLICATIONS

This application is based upon and claims the benefit of priority from Japanese Patent Application No. 2019-219591, filed Dec. 4, 2019, the entire contents of which are incorporated herein by reference.

FIELD

Embodiments described herein relate generally to an information processing apparatus and an information processing method.

BACKGROUND

Various information is recorded by operators, etc. at manufacturing sites and maintenance inspection sites. For example, measurement values as a result of using measurement devices and results of visual inspection are recorded as record data via forms/table preparation tools (software), etc. Such record data are often shared between operators and clients.

In many forms/table preparation tools, a template is often provided in advance. Thus, in order to input additional data, it is necessary to input it as a memo in the margin or attach a text memo for the designated item using a function of the forms tools.

The additional data is not limited to a text and may be multimedia data. For example, in order to associate multimedia data to table data, one method is to attach multimedia data to the table data as a memo and display an icon showing that the memo is attached.

However, in order to review the content of the memo attached, the operator must stop the operation and perform another reviewing operation, for example, playing the attached video memo. Furthermore, reviewing the content takes time and increases working hours. To avoid reviewing audio memo, speech recognition can convert the audio data into text and attach the text as a memo. However, conversion process such as speech recognition will take a certain time. When the text memo is not displayed before conversion, the operator cannot understand why the text is not displayed and is forced to play the multimedia data.

BRIEF DESCRIPTION OF THE DRAWINGS

FIG. 1 is a diagram showing one example of a functional configuration of an information processing apparatus according to a first embodiment.

FIG. 4 is a flowchart showing one example of a memo attachment process of the processes shown in FIG. 3.

FIG. 6 is a diagram showing one example of record data according to the first embodiment.

FIG. 7 is a diagram showing one example of memo management data according to the first embodiment.

FIG. 9 is a diagram showing a first example of a memo view according to the first embodiment.

FIG. 10A is a diagram showing a second example of the memo view according to the first embodiment.

FIG. 10B is a diagram showing a third example of the memo view according to the first embodiment.

FIG. 12 is a flowchart showing one example of a process according to the information processing apparatus of the second embodiment.

DETAILED DESCRIPTION

Figure 2:
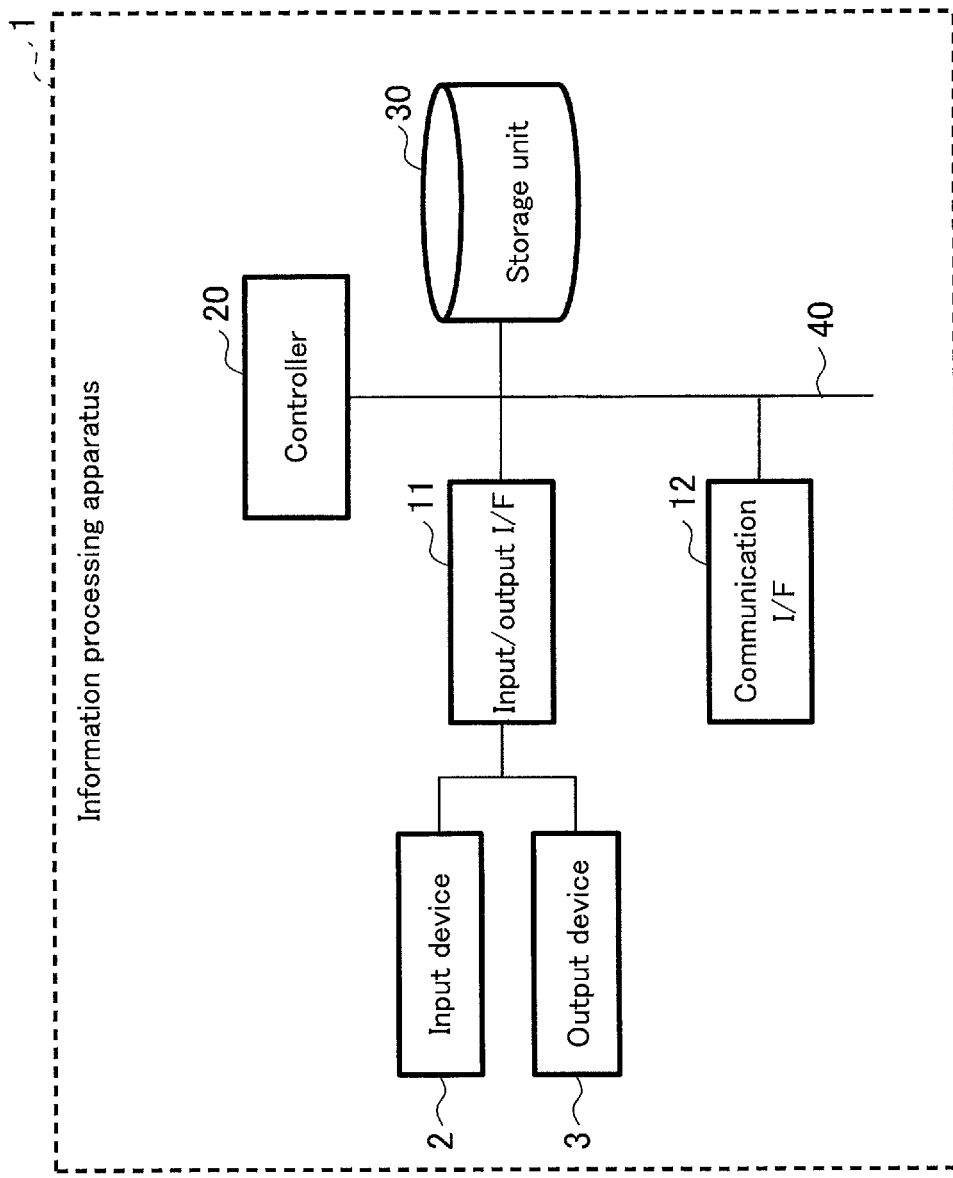
FIG. 2 is a diagram showing one example of a hardware configuration of the information processing apparatus according to the first embodiment.

According to one embodiment, an information processing apparatus includes an acquisition unit, a conversion unit, and a display controller. The acquisition unit acquires multimedia data associated with an item of record data having a plurality of items. The conversion unit performs a conversion process from the multimedia data to first display data showing a content of the multimedia data. The display controller associates the first display data with the record data and displays the first display data when the conversion process is completed, and displays second display data showing a progress status of the conversion process when the conversion process is incomplete.

Hereinafter, various embodiments will be described with reference to the accompanying drawings.

First Embodiment (1-1) Configuration

FIG. 1 is a diagram showing one example of a functional configuration of an information processing apparatus 1 according to a first embodiment.

The information processing apparatus 1 is a personal computer (PC), smart phone, tablet PC, etc., which is capable of attaching, associating and handling multimedia data as a memo to record data having a plurality of items such as forms or table data, etc. The information processing apparatus 1 further converts the multimedia data to display data showing its contents, and associates and displays the obtained display data or the progress status of the conversion process with the item of the record data attached with the multimedia data.

The information process apparatus 1 is configured to be communicable with a server 100 via a network NW.

The network NW is, for example, configured from the IP (Internet Protocol) network represented by the Internet, and a plurality of access networks for accessing to this IP network. As an example of the access networks, a wireless LAN (Local Area Network), a portable mobile network, a wired telephone network, FTTH (Fiber To The Home), and CATV (Cable Television) network can be used.

The server 100 provides an online data conversion service which is operated and managed by a service provider. The information processing apparatus 1 transmits the multimedia data to the server 100 via the network NW, and receives the display data showing the content of the multimedia data as a conversion result from the server 100. For example, the server 100 provides a speech recognition service (hereinafter referred to as "cloud-type speech recognition service") for converting voice data to text data.

The information processing apparatus 1 may be configured to be communicable with a plurality of servers 100. The plurality of servers 100 may all provide the speech recognition service, or may respectively provide different data conversion services such as speech recognition, character recognition, and image recognition, etc.

The information processing apparatus 1 comprises an input/output interface 11, a communication interface 12, a controller 20, and a storage unit 30.

The communication interface 12 includes, e.g., one or more wired or wireless communication interface units and is capable of transmitting and receiving information to and from the server 100. As a wired interface, e.g., a wired LAN is used, and for a wireless interface, e.g., an interface employing a low power wireless data communication standard such as wireless LAN or Bluetooth (registered trademark) is used.

The input/output interface 11 is connected with an input device 2 and an output device 3 attached to the information processing apparatus 1. The input device 2 includes an input device for recording multimedia data, for example, a microphone for recording a voice memo spoken by the user, a video camera for recording a video or photographing still images, and so on. The input device 2 includes an input device for accepting an operation by a user, for example, a keyboard, a mouse, a button, a switch, etc. The output device 3 includes a display for displaying various data (for example, a liquid crystal or organic EL display (Electro Luminescence)) and a speaker for outputting a reproduced voice memo. The input device 2 and the output device 3 may be integrated into one unit, such as a tablet PC which comprises a touch screen having a touch input and a display function.

The input/output interface 11 imports voice data inputted by the user via the input device 2 or operation data, transfers it to the controller 20, and performs the processes of outputting and displaying display data outputted from the controller 20 to the output device 3. Further, a device embedded in the apparatus 1 may be used as the input device 2 and the output device 3, or an input device and an output device of another information terminal communicable via the network NW may be used.

The storage unit 30 comprises a record data storage unit 31 and a memo storage unit 32.

The record data storage unit 31 stores record data having a plurality of items to which memos are attached. The record data is data with an input area per item and shown in the forms or tables.

The memo storage unit 32 functions as a first storage unit or a second storage unit and stores memo management data which retains a pointer to an attachment target item, a pointer to multimedia data, a memo conversion status, a conversion result and a failure detail.

The controller 20 includes a hardware processor such as a central processing unit (CPU), etc. The controller 20 comprises a multimedia data acquisition unit 21, a conversion controller 22 and a display controller 23 as a process function unit regarding the embodiment.

The multimedia data acquisition unit 21 performs the process of importing the multimedia data via the input/output interface 11 as a first acquisition unit. The multimedia data is associated with an item of the record data. The multimedia data acquisition unit 21 also performs the process of acquiring information for identifying the attachment target item of the multimedia data, and performs a writing process to the memo management data stored in the memory storage unit 32. The multimedia data handled by the information processing apparatus 1 includes various data such as voice data, still image data, and video data.

The conversion controller 22, as a converter, performs the process of converting the acquired multimedia data to display data showing the content of the multimedia data. The display data may be text data or image data such as an icon or a pictogram. The conversion controller 22 may generate progress information showing a progress status (also called "conversion status") of the conversion process to the display data. The progress status, for example, includes a status of unconverted, being converted, converted, or conversion failed, etc. The conversion controller 22 performs the process of writing a conversion result or progress information to the memo management data stored to the memo storage unit 32.

The conversion controller 22 may include a speech recognition client 221.

The speech recognition client 221, as a conversion client unit, performs the process of converting voice data to text data by a cloud-type speech recognition service. In other words, the speech recognition client 221 transmits the voice data to the server 100 which is a voice recognition server or a conversion server via the communication interface 12 and receives text data as a conversion result from the server 100.

The conversion controller 22 may perform conversion processing from multimedia data other than the voice data to display data showing its content. For example, the conversion controller 22 may extract the character information from the still image or the video data using a pattern recognition technique, etc. As one example, the conversion controller 22 can generate text data corresponding to the indication value from an image of a digital meter or an analog meter. In other words, the conversion controller 22 performs the conversion process from the still image or the video data to the text data representing a character recognition result. More specifically, the conversion controller 22 may apply object recognition or anomaly detection to the still image or the video data, and output such result as the display data. As one example, the conversion controller 22 can output a chips/cracks detection result as display data including text or image, such as presence or absence, density, break pattern, and change in color. More specifically, the conversion controller 22 may convert a still image or a video data to the text data or image data indicating the features extracted from the still image or the video data. Such a conversion process may be achieved using a cloud-type service and the conversion controller 22 further comprises a client unit for converting data other than voice data to display data.

However, the conversion process by the conversion controller 22 is not limited only to the conversion process from the multimedia data to the text data or the image data, and the converted data may be in other data format. For example, the conversion controller 22 may convert multimedia data to binary data, and a subsequent function unit such as the display controller 23 may convert the binary data to the display data.

The display controller 23, based on the memo management data stored in the memory storage unit 32, generates display data for displaying a memo content or a memo conversion status and conversion result attached to the item of the record data in association with the attachment target item, and outputs the display data to the output device 3 such as a display, etc.

The following is a detailed explanation of each configuration of the information processing apparatus 1 shown in FIG. 1.

In the following explanation, the information processing apparatus 1 is a tablet PC comprising a touch screen having a touch input and display function, and a microphone for voice input, the multimedia data is voice data, and the speech recognition client 221 communicates with the server 100 and uses the cloud-type speech recognition service provided by the server 100 to convert from the voice data to the text data.

The information processing apparatus (tablet PC) 1 receives a user operation, attaches a voice memo to the table data (a record data), converts and displays the result. An apparatus with functions of attaching, converting and displaying a voice memo (hereinafter collectively called "voice memo attachment function") is not limited to a tablet PC, and may be any device having an input unit and an output unit such as a smart phone, PC comprising a mouse, and so on. Further, the voice memo attachment function may be a different program from the program for displaying and inputting table data (hereinafter referred to as "table input program"), or may be incorporated in the same program as one function or an add-on.

FIG. 6 shows an example of record data stored in the record data storage unit 31. The record data 50 is capable of designating the target item (input column) by row number (RW1-RW5) and column number (CL1-CL7). In this example, the record data 50 includes "no.", "test item", "measurement value (R, S, T)", "unit" and "judgement (good/bad)." In this example, values can be inputted in columns CL3-CL5 ("measurement value (R,S,T)") of row RW2-RW5 of the record data 50 and CL7 ("judgement (good/bad)"), and row of RW2 ("No. 1", "minimum actual current") is inputted with virtual values ("3.91", "4.05", "4.12" "Good").

FIG. 7 shows an example of memo management data 55 stored in the memo storage unit 32. In the memo management data 55, each line corresponds to one memo, and the item names include "item pointer" 55a, "voice data file" 55b, "conversion status" 55c, "conversion result" 55d, and "failure detail" 55e.

The item pointer 55a represents an item to which a memo is attached. More specifically, when the attachment target data is table data, the position of the item can be represented in the format of "row (RW) number, column (CL) number." In the example of FIG. 7, the expression "(row number of item, column number of item)" is used to represent a specific one item, and the expressions "(row number of first item, column number of first item)–(row number of last item, column number of last item)" are used to represent multiple items. For example, an item pointer=(2, 7) represents item at the row number 2 (RW2), column 7 (CL7) inputted with "good" value in FIG. 6. The item pointer=(3, 1)–(3, 7) represents all items in row number 3 (RW3) and column numbers 1-7 (CL1-CL7) in FIG. 6. Further, the format of the item pointer is not limited to this format, and for example, if an ID is added to the input item at the forms data, such ID may be used as the item pointer.

The voice data file 55b represents a pointer to the voice data. FIG. 7 shows the pointer to the voice data being represented as a file name (or URL) of the voice data file. The file name is automatically generated during memo attachment. For example, the date and time at the time of memo attachment may be used as a file name. The user or others may optionally set the file name.

The conversion status 55c shows the conversion status of the memo in the conversion controller 22. In this embodiment, there are four conversion statuses of "unconverted", "converting", "converted", and "conversion failed." Further, conversion failed includes the case when the conversion result is "empty." This will be described later.

The conversion status 55d represents the conversion result when the conversion process of the memo in the conversion controller 22 is successful (completed). When the conversion process in the conversion controller 22 is speech recognition, the conversion result is represented by text data of the speech recognition result from the recorded voice data.

The failure detail 55e shows the details of failure when the conversion process of the memo in conversion controller 22 has failed. The conversion controller 22 receives a response message from the server 100 or a message indicating a failure in communication with the server 100 from the speech recognition client 221 and determines the details of failure.

When the conversion controller 22 is a client capable of using a cloud-type speech recognition service, the failure detail, for example, includes various network errors and errors at the speech recognition service side. Network errors include, for example, not reaching the cloud-type speech recognition service because of a network problem, Wi-Fi unavailable, and so on. In this case, an error occurs during communication from the client to the server side; for example, the client catches exception in the program, and determines that there was a conversion failure and the failure detail is a network error. As errors at the speech recognition service side, problems such as the service being busy, and an error occurring in the interior of the speech recognition server may occur. These server side errors may be obtained as a response (error message) from the server. When the response from the server is an error message, the client can determine that the conversion has failed and can get the failure detail from the error message.

Even after determining that the speech recognition process is completed, sometimes the recognition result is an empty text, i.e., nothing was recognized. In the embodiment, when the client receives an empty recognition result, such matter will be handled as a conversion failure, and the failure detail is handled as "conversion result is empty." Displaying the empty recognition result as an error helps the user to determine if the recognition result is empty or not yet recognized for some reason, when displaying the association which is described later.

When the speech recognition client 221 transmits the voice data to the server 100 via a network NW, the speech recognition process is executed at the server 100, and the text which is a result of speech recognition is received by the speech recognition client 221 via the network NW. Thus, the speech recognition client 221 sends a recognition complete event. In addition, when a network error occurs, when a speech recognition service error occurs, or when the text as a speech recognition result is empty, the speech recognition client 221 sends a failed recognition event.

As described above, the information processing apparatus 1 may handle the image data or the video data in addition to the voice data. The conversion controller 22 is not limitative, as long as it converts multimedia data to other data. Some examples are analyzing the attached voice data and evaluating whether there is a problem with noise by a binary answer of "○ (Good/Pass)" and "x (Bad/Fail)" instead of a text response, or analyzing the attached photographic data to return the image data of enhanced results of the broken parts shown in the picture, or return the ratio on the surface of the crack shown on the pictures.

FIG. 2 is a diagram showing one example of a hardware configuration of the information processing apparatus 1 shown in FIG. 1.

The information processing apparatus 1 comprises an input/output interface (I/F) 11, a communication interface (I/F) 12, a controller 20, and a storage unit 30, and all of the components are connected via a bus 40.

The storage unit 30 uses a non-volatile memory capable of writing and reading, e.g., a SSD (Solid State Drive), etc., as a storage medium as needed. In addition to or instead of the SSD, the storage medium may be a combination of HDD (Hard Disk Drive), ROM (Read Only Memory) and RAM (Random Access Memory).

A program storage area and a data storage area are provided in the storage area of the storage unit 30. The program storage area stores an application program necessary for executing the control process according to one embodiment, in addition to the middleware such as OS (operating system), etc. The data storage area stores a record data storage unit 31 and a memory storage unit 32 as a necessary storage unit when executing the embodiment.

The controller 20 is a processor such as a CPU. The controller 20, by executing a program stored in the program storage area of the storage unit 30, operates as a process function unit including a multimedia data acquisition unit 21, a conversion controller 22, and a display controller 23. The controller may be achieved by other various formats such as MPU (Micro Processing Unit), ASIC (Application Specific Integrated Circuit), FPGA (field-programmable gate array), etc.

As described above, at a manufacturing site or a maintenance inspection site, various information is inputted to the record data, and the record data is shared amongst the operators or clients. When attaching a memo to such record data, in many cases, it is necessary to input the memo as a text form in the margin, or attach a text memo. However, stopping the operation and inputting a text memo during operation takes time. Thus, alternatives such as speaking to a microphone or attaching a photographed image are possible. However, even if such a memo is attached, in order to check the contents, it is necessary to explicitly display (play in the case of a voice memo) the content. Displaying the content using hands, or content that needs to be reviewed takes time (in the case of voice memos, actually listening) and will lead much wasted time.

When adding the voice memo, it is possible to display the voice data of the memo as a text of the speech recognition result. However, speech recognition takes time; and therefore, cannot be instantly turned into text. Also, speech recognition sometimes fails and in that case, the text will not be displayed. In such a case, the operator cannot understand why the text is not displayed, and there will be no method of checking the content other than displaying (playing) the memo.

The information processing apparatus 1 according to the embodiment displays the multimedia memo attached to the forms or the table with the information of attachment target, the conversion status, and the conversion results so that the original content of the attachment target is linked with the content of the memo and can be reviewed at first glance, and when the content of the memo is not displayed, countermeasures therefor are considered.

(1-2) Operation

Next, an information processing operation by the information processing apparatus 1 according to the first embodiment configured above is explained.

Figure 3:
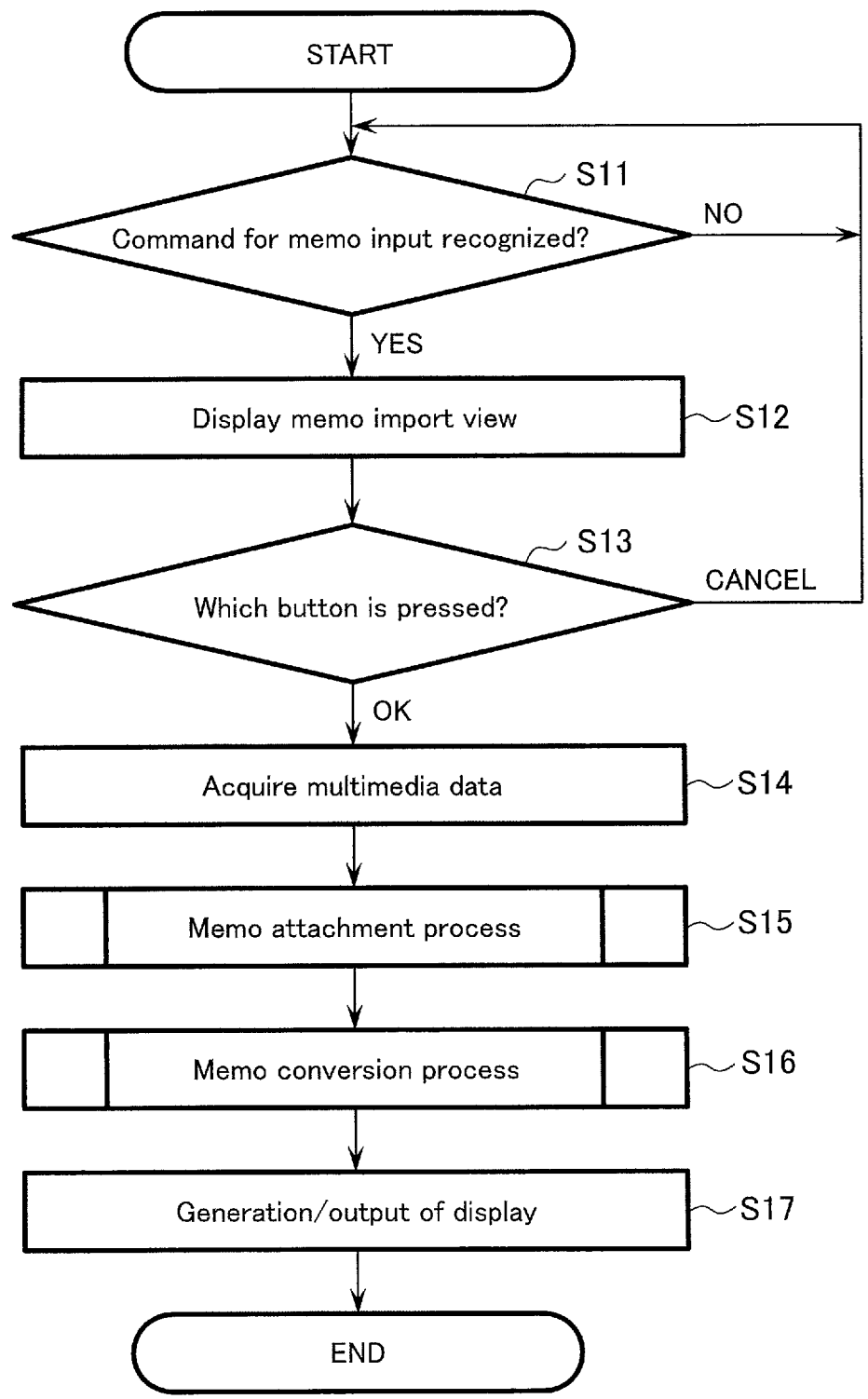
FIG. 3 is a flowchart showing one example of a process according to the information processing apparatus of the first embodiment.

FIG. 3 is a flowchart showing one example of a procedure and processing details according to the information processing apparatus 1 of the first embodiment. A table input program is activated on the information processing apparatus 1 such as a tablet PC, etc., and displays table data as record data.

The information processing apparatus 1 monitors the presence or absence of a trigger for starting the process at step S11. The user inputs the spoken voice through a microphone and when the voice command such as "add voice memo" is detected, the information processing apparatus 1, under the control of a controller 20, specifies the item of memo attachment target and executes the following process by activating the voice memo attachment function. Further, the voice command may be detected by using a lightweight speech recognition executed on the information processing apparatus 1 as described in for example, Patent Document 2. The item of the memo attachment target may be specified by the multimedia data acquisition unit 21 requesting information identifying the item to the table input program.

In step S12, the information processing apparatus 1, under the control of the display controller 23, generates and displays a memo import view based on, e.g., a display data stored in advance to the storage unit 30, and item identification information acquired by the multimedia data acquisition unit 21.

Figure 8:
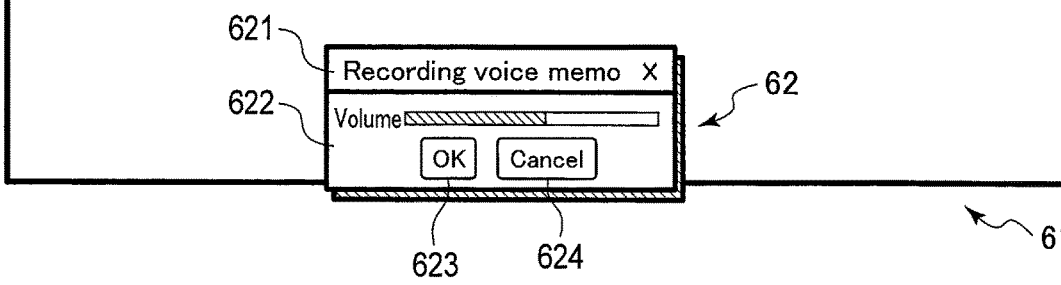
FIG. 8 is a diagram showing one example of a memo import view according to the first embodiment.

FIG. 8 shows one example of such a memo import view. The memo import view includes a record data area 60, a memo area 61, and a recording window 62.

The record data area 60 is displayed during activation of the table input program and indicates the contents of the table data. When the voice memo attachment function is activated, the record data area 60 further shows the memo attachment target item. In this example, an item (2, 7) that is the memo attachment target is inversely displayed.

The memo area 61 displays the voice memo attachment function during activation. The memo area 61 may be arranged side-by-side to the record data area 60 for simultaneous browsing. The memo area 61 displays a display data indicating a content of a memo or conversion status; however, the memo import is not completed at this point, and a blank column is displayed.

The recording window 62 is also displayed during the activation of the voice memo attachment function. In this example, the recording window 62 includes a title unit 621 which displays "recording voice memo", a bar 622 showing recording sound volume, an "OK" button 623, and a "Cancel" button 624. In an exemplary instance, the recording of the voice memo starts with the display of the recording window 62, and the recording continues until the OK button 623 or the Cancel button 624 is pressed.

In step S13, the information processing apparatus 1 determines which button is pressed. When it is determined that the Cancel button 624 is pressed (CANCEL), the voice memo attachment function is terminated, the recording window 62 closes, and the process returns to step S11. When it is determined that the OK button 623 is pressed (OK), the information processing apparatus 1 terminates the recording while still activating the voice memo attachment function, closes the recording window 62, and proceeds to step S14.

In step S14, the information processing apparatus 1, under the control of multimedia data acquisition unit 21, acquires recorded voice data as multimedia data to be attached.

In step S15, the information processing apparatus 1, under the control of the multimedia data acquisition unit 21, starts a memo attachment process using the acquired voice data.

FIG. 4 is a flowchart indicating the details of the memo attachment process.

Firstly, in step S151, the multimedia data acquisition unit 21 generates an item pointer (P) indicating the attachment target item. As described above, in this embodiment, the item pointer is shown in the format of "(item row number, item column number)" or "(row number of first item, column number of first item)–(row number of last item, column number of last item)."

Next, in step S152, the multimedia data acquisition unit 21 stores the voice data and generates its file name or save location URL (U). Further, the save location of voice data may be in a non-illustrated storage area in the storage unit 30 or may be an external storage apparatus.

In step S153, the multimedia data acquisition unit 21 adds new memo data (a data record) to the memo management data stored in the memo storage unit 32, and inputs the above "item pointer (P)" to "item pointer", the above "file name or storage location URL (U)" to "voice data file" and "unconverted" to "conversion status." The "conversion result" and "failure detail" are left empty (blank).

Next, in step S16 of FIG. 3, the information processing apparatus 1, under the control of the conversion controller 22, performs a memo conversion process.

Figure 5:
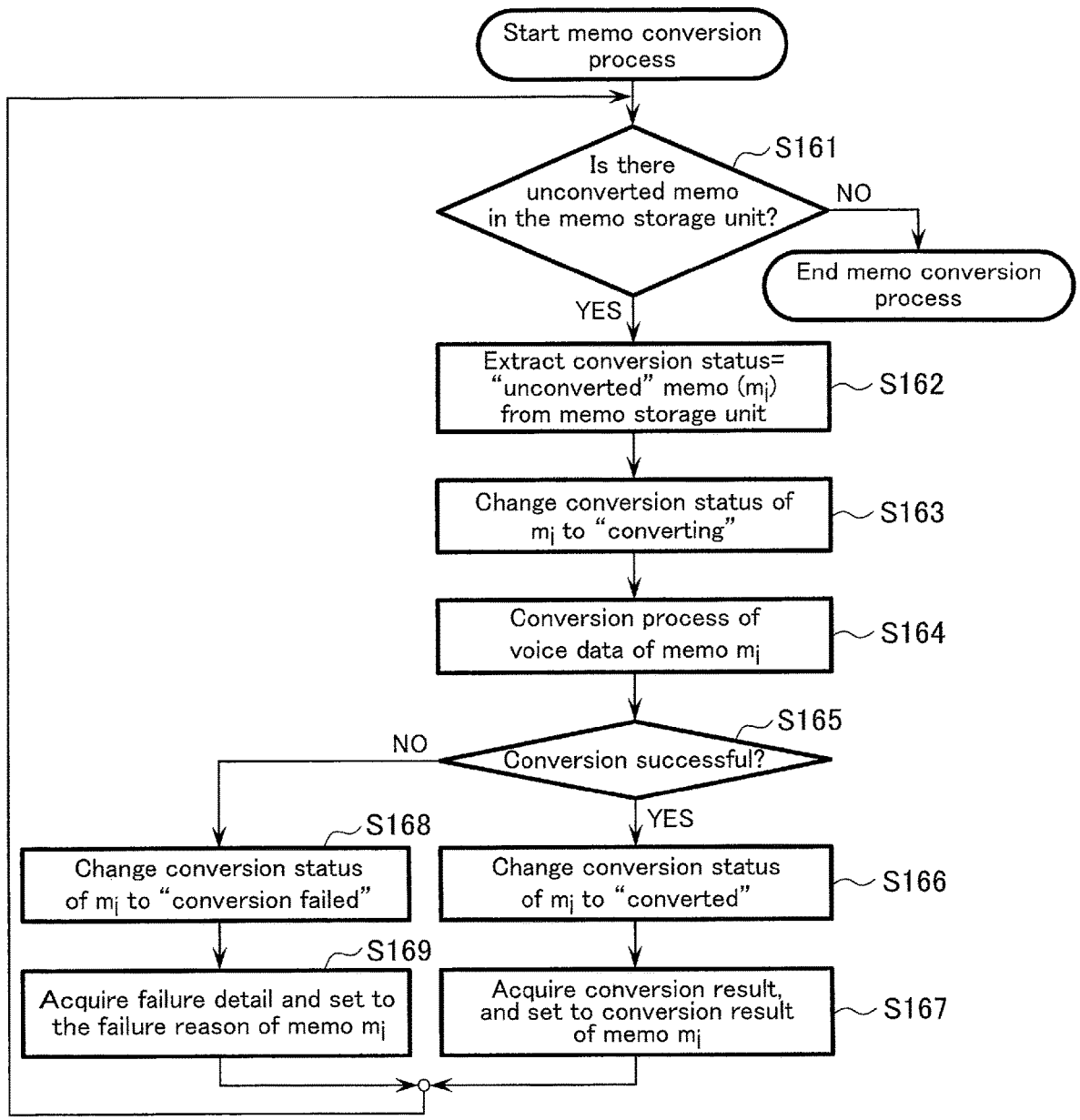
FIG. 5 is a flowchart showing one example of a memo conversion process of the processes shown in FIG. 3.

FIG. 5 is a flowchart indicating the details of the memo conversion process.

Firstly, in step S161, the conversion controller 22 monitors the memo management data stored in the memo storage unit 32, and determines whether or not there is memo data with the "unconverted" conversion status. When the memo has no "unconverted" memo data (NO), the memo conversion process is terminated. If there is "unconverted" memo data (YES), the process proceeds to step S162.

In step S162, the conversion controller 22 extracts memo data with the conversion status="unconverted" from the memo storage unit 32 as memo $m_i$.

In step S163, the conversion controller 22 changes the conversion status of memo $m_i$ in the memo management data to "converting."

In step S164, the conversion controller 22, under the control of the speech recognition client 221, starts the conversion process of the voice data attached to memo $m_i$. In the embodiment, the speech recognition client 221 acquires voice data based on file name or URL described in the memo $m_i$, transmits the voice data to the server 100, and waits for return of the conversion result of the server 100. The conversion controller 22 after detecting predetermined conditions such as receiving the conversion results from the server 100 or communication failures with the server 100, proceeds to step S165.

In step S165, the conversion controller 22 determines whether the conversion (speech recognition) is successful or not. If the conversion is successful, in other words, if speech recognition result is obtained (YES), the process proceeds to step S166.

In step S166, the conversion controller 22 changes the conversion status of memo $m_i$ in the memo management data stored in the memo storage unit 32 to "converted."

In step S167, the conversion controller 22 sets a text of speech recognition result at the column of conversion results in the memo management data.

On the other hand, in step S165, when it is determined that the conversion has failed (NO), the process proceeds to step S168.

In step S168, the conversion controller 22 changes the conversion status of memo $m_i$ in the memo management data stored in the memo storage unit 32 to "conversion failed."

In step S169, the conversion controller 22 sets the determined failure detail to the failure detail of memo $m_i$ in the memo management data.

After completing step S167 or S169, the process once again returns to step S161. Further, the conversion controller 22 continues the process of retrieving the memo if there is an unconverted memo. In step S161, if there are multiple unconverted memos, the conversion order is in the order of chronologically oldest memos. If it is determined that there is no unconverted memo, the memo conversion process is terminated and returns to step S17 of FIG. 3. In the above memo conversion process, only one memo per process is converted; however, if the speech recognition service is available for multiple use or if the speech recognition service allows simultaneous plural speech processing, then the plurality of memo conversions can be performed in parallel.

In step S17, the information processing apparatus 1 monitors the memo management data stored in the memo storage unit 32. Further, when the memo management data is changed, under the control of the display controller 23, a display based on the memo management data is generated and outputted, and displayed to the output device 3 for updating the display.

FIG. 9 shows one example of a memo view displayed on the display as the output device 3. The memo view includes a record data area 60, a memo area 61, and a playing window 63. In this example, the four memos are attached to the record data displayed in the record data area 60 and the memo area 61 displays the attached memo for each row (61*a* to 61*d*). The memo area 61 includes a text 611 showing a date and time generated from the file name of the voice data, a text 612 showing item pointers, a voice data play button 613, and a text 614 showing a content of voice data or progress status of the conversion process. In this example, the text 614 displays a result of speech recognition, an icon (clock mark) indicating that the data is being converted during converting, or the failure detail. When the voice data play button 613 is pressed, the play window 63 is displayed. The play window 63 includes a title bar 631 for identifying a reproduction target, a seek bar 632, a play button 633, and a stop button 634. For example, the voice data is played by the user pressing the play button 633.

Further, in this example, the text 612 shows the item pointers using the format of "(row header of item)–(column header of item)"; however, it is not limited to the above, and any of format such as "(row number, column number)" may be used.

For example, a row 61a displays "8/21 10:30" as the text 611, and indicates a presence of a memo recorded on "August 21 10:30." The row 61a displays "2-judgement" as the text 612, and indicates that the memo is attached to "judgement" column (CL7) of row number 2 (RW2). The row 61a displays "abnormal noise during measurement" which is the conversion result of the voice data as the text 614. Further, along with the conversion result of such voice data, it is possible to display a text representing conversion status such as "conversion completed" or "converted."

The row 61b displays "recognition failure (no network connection)" as the text 614 and indicates that the no network connection was the reason for failing recognition (conversion) of voice data. The row 61c displays the clock mark and the word "(recognizing)" as the text 614 and indicates that the voice data is in the recognition (conversion) process. The row 61d displays "(waiting recognition)" as the text 614, and also shows that the recognition is not yet started (unconverted).

According to the embodiment, the recognition result and the failure detail may be displayed so that it can be differentiated. For example, the recognition result can be displayed by a normal text color (such as black) and the failure detail can be displayed by an error text color (such as red). A dedicated icon may be displayed in the case of recognition failure. An icon indicating recognition (being converted) or waiting for recognition (unconverted) may be used or displayed with a text indicating such matters as shown in the drawings.

Aside from associating the memo with the item of the memo attachment target using text as described above, it is possible to display a numbered icon for the item to which the memo in the recorded data is attached and display the corresponding number in the memo view.

FIG. 10A shows one example of such a memo view. In FIG. 10A, icons "*1" to "*4" are displayed in the record data area 60, respectively indicating that they are items to which the memos are attached. The memo area 61 displays an item pointer 615 corresponding to "*1" to "*4" in the record data area 60 instead of the text 612 showing the item pointer indicated in FIG. 9 (612).

Further, color may be used to express the association, such as a separate background color for the memo attachment target item, and the same color for a display column of the corresponding memo.

FIG. 10B shows one example of such a memo view. The item in the record data area 60 which is the memo attachment target and each line in the memo area 61 are filled by the same colors, showing the correspondence.

As can be seen from the above, the first embodiment activates the memo attachment function when a predetermined voice command is detected. Further, while the memo attachment function is being executed, the memo conversion process continues running. By the process such as importing, adding, and converting memos, and so on, the data in the memo storage unit 32 is updated and the display controller update view every time the data is updated.

Further, in the above embodiment, the text of the speech recognition result is displayed as the conversion result; however, if the conversion controller 22 is not speech recognition or does not return the text, such matter may be displayed in a displayable format on the screen. For example, the icon or the image is generated and displayed as display data showing the content of the multimedia data.

(1-3) Effect

As explained above, the information processing apparatus 1 of the first embodiment imports multimedia data attached as a memo to the record data such as a form, converts the imported data to display data showing the contents of the multimedia data, associates it with the item of the attachment target, and along with the record data, displays the display data or the information showing the progress status of the conversion process. When the multimedia data is voice data, the information processing apparatus 1 associates the progress status of the speech recognition and the speech recognition result text with the memo attachment target item and displays them, and when speech recognition fails, displays the information concerning its cause. When the multimedia data is data other than the voice data, the information processing apparatus 1 similarly associates the progress state of the conversion process to the display data showing such matter or the converted result with the attachment target item and displays them. Thus, the information processing apparatus 1 displays the original record data and also displays the memo content linked with the attachment target item with enhanced browsability. As the displayed progress status, information such as whether the data is unconverted or being converted, or the conversion has failed is included. In the case of failed conversion, it is possible to show whether the failure was caused by a network error or by a server side error. Thus, the user of the information processing apparatus 1 may glance at the memo content by looking at the record data, and even if the memo content is not displayed, it is possible to suitably deal with the cause at first glance.

By the above, for example, at the manufacturing maintenance site, the operator can input a voice memo to the table or forms without the operator stopping the operation. Further, when the record data is shared amongst other operators, the content of the memo can be understood at first glance.

Second Embodiment

An information processing apparatus 1 according to a second embodiment uses speech recognition to input items of record data and perform all operations by voice including memo attachment operation.

More specifically, the information processing apparatus 1 according to the second embodiment performs voice input to record data such as forms using an input procedure list. In the voice input process, the information processing apparatus 1 extracts the input procedure in order in accordance with a procedure number from the input procedure list one by one. Further, the spoken voice is recognized as command using a command dictionary which depends on an input format set by the extracted input procedure. More specifically, if the input format is "numeric", a command dictionary with which command recognition can detect both a command for inputting a numerical value and a command for memo attachment is used.

In the following, the second embodiment is described by focusing on the difference with the first embodiment.

(2-1) Configuration

Figure 11:
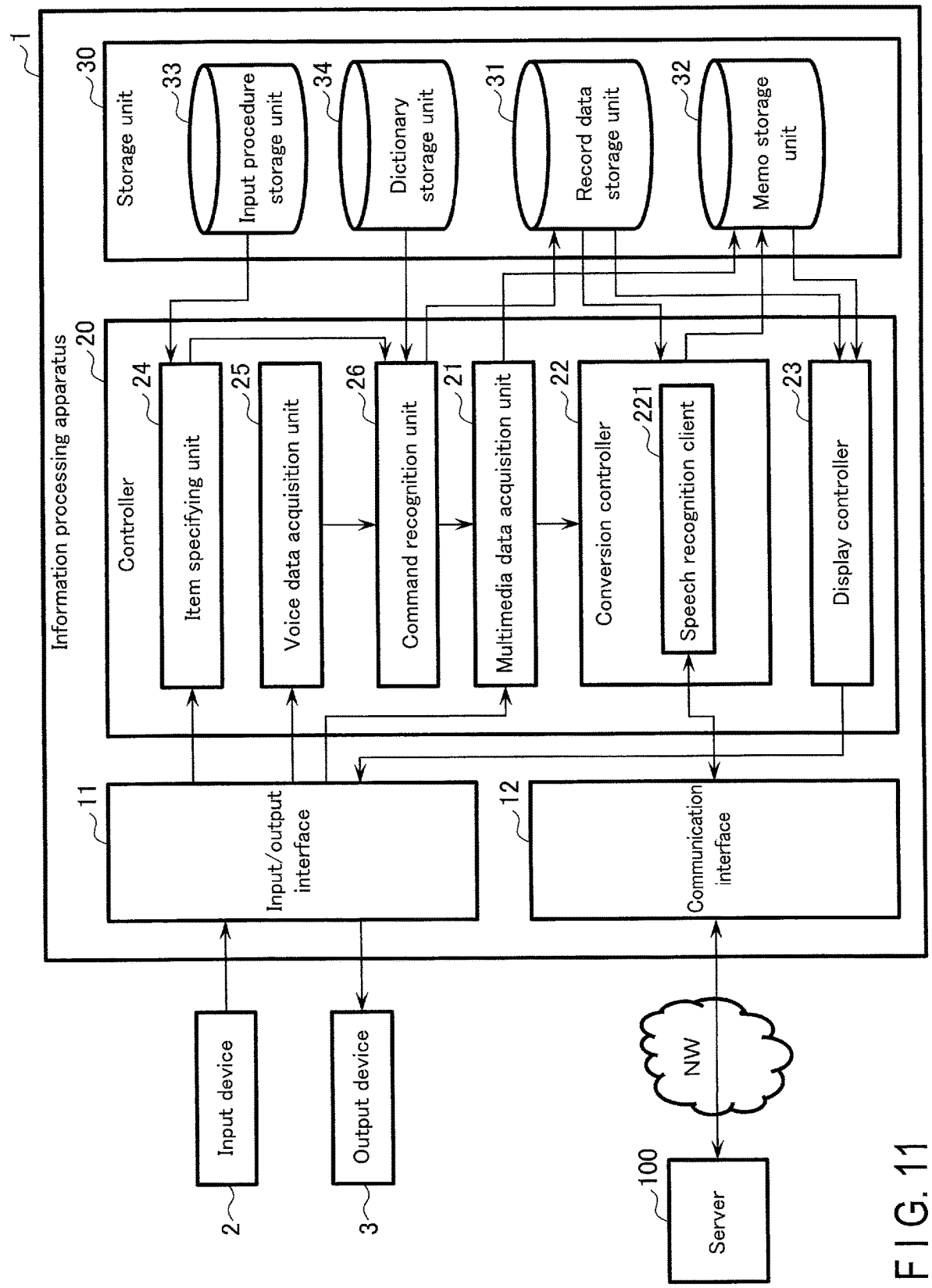
FIG. 11 is a diagram showing one example of a functional configuration of an information processing apparatus according to a second embodiment.

FIG. 11 showing a functional configuration of the information processing apparatus 1 according to the second embodiment. The second embodiment has a similar structure to the first embodiment and uses the same reference numerals, thus a detailed description thereof is omitted. Further, the same hardware configuration as in the first embodiment is adopted.

The information processing apparatus 1 according to the second embodiment comprises an input/output interface 11, a communication interface 12, a controller 20, and a storage unit 30, which are similar to those of the first embodiment.

The storage unit 30 of the information processing apparatus 1 according to the second embodiment comprises an input procedure storage unit 33, and a dictionary storage unit 34 in addition to a record data storage unit 31 and a memo storage unit 32.

The input procedure storage unit 33 stores the predefined input procedure list for designating an input order for items of the record data. The controller 20 inputs a speech recognition result text as a value to the input target item in accordance with the above list. The memo attachment is performed when a memo attachment command is detected while inputting the value.

The dictionary storage unit 34 stores a command dictionary used for recognizing the voice command.

The controller 20 of the information processing apparatus 1 according to the second embodiment comprises an item specifying unit 24, a voice data acquisition unit 25, and a command recognition unit 26 in addition to a multimedia data acquisition unit 21, a conversion controller 22, and a display controller 23.

The item specifying unit 24, as a specifying unit for specifying the input target item, performs the process of specifying a target item of the current input procedure in the record data based on the input procedure list stored in the input procedure storage unit 33.

The voice data acquisition unit 25 performs the process of acquiring voice data input via a microphone, etc., as a second acquisition unit. The voice data acquisition unit 25 may be integral with the multimedia data acquisition unit 21.

The command recognition unit 26 is a lightweight speech recognition function unit and operates as a speech recognition unit on a terminal. The command recognition unit 26, from the acquired voice data, can recognize the content to be input to the item of the record data (for example, simple numbers or terms), simple commands such as a command for memo attachment (for example, "add voice memo to previous item", "add voice memo", and "add photograph memo") and a command for stopping the voice memo recording (for example, "end voice memo"). The content that the command recognition unit 26 recognizes is designated in the command dictionary stored in the dictionary storage unit 34. The command dictionary stores recognizable terms or combinations thereof as a list. The command recognition may use the technique described in for example, Patent Document 2 or use other techniques.

(2-2) Operation

Next, an information processing operation by the information processing apparatus 1 according to the second embodiment configured above is explained.

FIG. 12 is a flowchart showing one example of a procedure and processing details according to the information processing apparatus 1 of the second embodiment.

In step S21, the information processing apparatus 1 monitors a voice input under the control of voice data acquisition unit 25. When the user speaks via the microphone, etc., the information processing apparatus 1 receives such speech as a voice input, and causes the voice data acquisition unit 25 to acquire the voice input as voice data and proceeds to step S22.

In step S22, the information processing apparatus 1 performs a voice input process.

Figure 13:
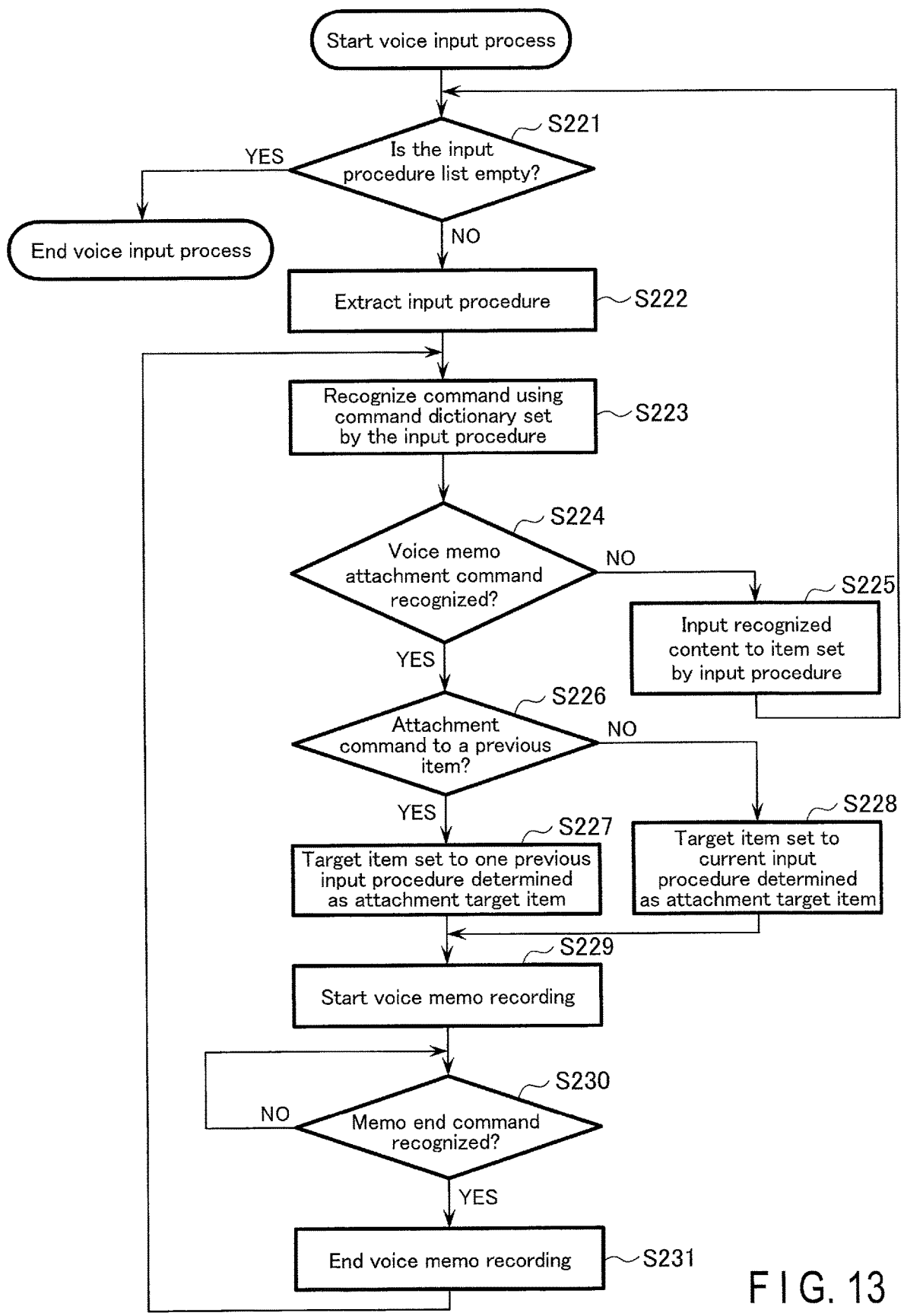
FIG. 13 is a flowchart showing one example of a voice input process of the processing shown in FIG. 12.

FIG. 13 is a flowchart indicating the details of the voice input process.

Firstly, in step S221, the information processing apparatus 1, under the control of the item specifying unit 24, reads the input procedure list stored in the input procedure storage unit 33, and determines whether the input procedure list is empty or not; in other words, if there is a next input target item or not. If the input procedure list is not empty (NO), the process proceeds to step S222, and if the input procedure list is empty (YES), the voice input process ends.

In step S222, the item specifying unit 24 extracts information of a next input target item from the input procedure list and passes it on to the command recognition unit 26.

Figure 14:
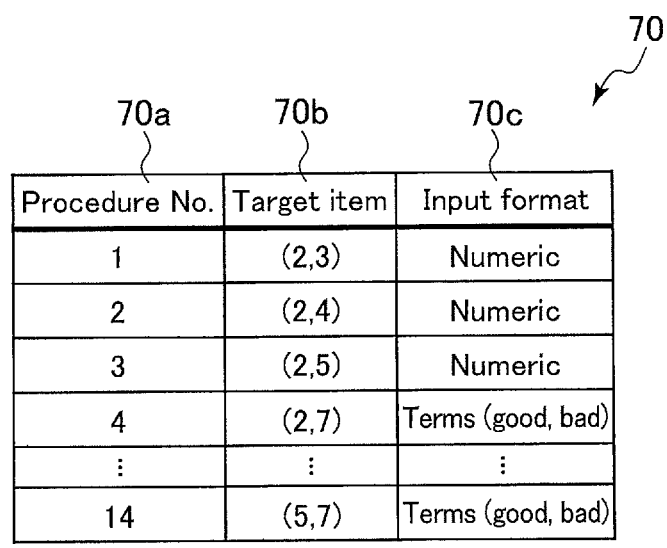
FIG. 14 is a diagram showing one example of an input procedure list according to the second embodiment.

Here, FIG. 14 shows an example of the input procedure list. The input procedure list 70 stores a set of a procedure number 70a, target item 70b, and input format 70c as a list. The target item 70b stores an input target item as a pointer (row number, column number). The input format 70c shows the input format for an input value of the target item 70b, for example, "numeric" or "terms (recognizable terms)." The command recognition unit 26 is capable of recognizing commands for memo attachment and commands for stopping voice memo recording. The information processing apparatus 1 of the second embodiment operates in accordance with an input order pre-designated in the input procedure list 70.

In step S223, the command recognition unit 26 performs a command recognition process from the voice data acquired by the voice data acquisition unit 25 using the command dictionary based on information designated in the input procedure list.

In step S224, the command recognition unit 26 determines whether the voice memo attachment command is detected or not. The voice memo attachment commands are commands for instructing the system to start input voice memo, and may include "add voice memo" as a command to attach the voice memo to the current input target item, and "add voice memo to a previous item" as a command to attach the voice memo to the previous item in the input procedure, for example. When the content spoken by the user is not recognized as a memo attachment command, i.e., when the voice memo attachment command is not detected (NO), the command recognition unit 26 determines that the recognized content indicates a value input to the item, and the process proceeds to step S225.

In step S225, the command recognition unit 26 outputs instructions to input recognized result to the target item (item set in the input procedure) of the record data. Input the value to the target item stored in the record data storage unit 31 may be executed by the command recognition unit 26 or may be executed by another function, not illustrated, in the controller 20.

On the other hand, in step S224, when the voice memo attachment command is detected (YES), the process proceeds to step S226.

In step S226, the command recognition unit 26 determines whether the command is a command for attachment to the previous item or not. Such determination is performed to specify the attachment target item of the voice memo when the voice input is performed in accordance with the input procedure list 70 as shown in FIG. 14.

More specifically, FIG. 14 first executes a procedure number 1. In the procedure number 1, the command recognition unit 26 recognizes the voice data as a "numeric" which is an input format designated at the procedure number 1 of the input procedure list 70, or as a memo attachment command. When the user says "3.91", the command recognition unit 26 detect the number "3.91" and inputs the recognized value "3.91" to the target item (2,3) (FIG. 8 shows the record data after input). Next, the item specifying unit 24 automatically proceeds to the next input item of the input procedure list, and specifies designated items (2, 4) in the procedure number 2 as a current target item. When the user next says "4.05", the command recognition unit 26 inputs the recognized number "4.05" to the current target item (2, 4), and similarly to the above, automatically proceeds to the next input item. The input procedure list proceeds to procedure numbers 3 and 4 in a similar manner and in the procedure number 4, the command recognition unit 26 recognizes the term [good], the term [bad] or the memo attachment command. In the procedure number 4, when the user says "add voice memo to previous item", the command recognition unit 26 detects the command which is an instruction for attaching the memo to the input target item (2, 5) of the procedure number 3, which is the previous procedure. On the other hand, when the user simply says, "add voice memo", the command recognition unit 26 recognizes it as an instruction to attach a memo to the current input target item (2, 7).

Further, the input target item can be designated by the voice command. More specifically, when the user (operator) says "row number 2, column number 3", through command recognition, the item (2, 3) is specified as the input target item. In such a case, the command dictionary can be constructed to recognize the "row number", "column number" and numerical values. The designation of the input target item is not limited to the above methods and the user may specify the input target item by a touch operation or mouse operation.

In step S226, when the command is determined as a command for attaching to the previous item (YES), the process proceeds to step S227. In step S227, the command recognition unit 26 determines the target item set to one previous input procedure as the attachment target item. In step S226, when the command is determined as not being a command for attaching to the previous item (NO), the process proceeds to step S228. In step S228, the command recognition unit 26 determines the target item set to the current input procedure as the attachment target item as described above.

In step S229, the command recognition unit 26 instructs the multimedia data acquisition unit 21 to acquire a multimedia data and multimedia data acquisition unit 21 starts voice memo recording. A memo import view as shown in FIG. 8 of the first embodiment may be displayed at this time. Further, similar to the first embodiment, the memo is not limited to the voice memo and a still image and a video can be imported. In this case, the command recognition unit 26 is configured to recognize a voice command such as, e.g., "add image memo", and when such a voice command is recognized, the camera is activated by instructing the multimedia acquisition unit 21 to start imaging.

During the data acquisition by the multimedia data acquisition unit 21, the command recognition unit 26 continues to wait fora memo end command spoken by the user in step S230. For example, when memo end command such as "end voice memo" is detected (YES), the process proceeds to step S231. Alternatively, the data acquisition can be terminated after a predetermined time has passed instead of waiting the memo end command.

In step S231, the voice memo recording is completed, and the process returns to step S223.

If the command is not detected using the designated command dictionary in step S224, a message requiring the user to speak once again may be displayed.

Next, the information processing apparatus 1 returns to step S23 of FIG. 12, performs the memo attachment process in step S23, the memo conversion process in step S24, and the generation display data process and output process in step S25. The processes of steps S23 to S25 can be executed in the similar manner as explained in reference to FIGS. 4 and 5 of the first embodiment.

As can be seen from the above, the information processing apparatus 1 according to the second embodiment uses two types of recognition processes: recognition using the command recognition unit 26, and recognition using the conversion controller 22. The recognition process using the command recognition unit 26 uses the recognition result for an input value to the target item itself, and operates at high speed; however, the recognition target is limited (for example, trigger word detection or list-type voice command recognition). The recognition process by the conversion controller 22 is used for generation of display data from the multimedia data, and though it may take time, it is not restrictive (for example, speech recognition of free speech or operation recognition from videos).

Further, in the information processing apparatus 1 according to the second embodiment, the item specifying unit 24 specifies the input target item. By using the above-mentioned input procedure list, the item specifying unit 24 may specify the target item for each procedure. Instead of using the target item of the input procedure list, it is possible to recognize the target item name by the command recognition unit 26. Alternatively, after importing the memo, the system can inquire the user of the input target item.

(2-3) Effect

As explained above, the information processing apparatus 1 according to the second embodiment, in addition to the first embodiment, accepts voice instruction for memo attachment instruction while waiting an input value to the target item spoken. Thus, the user can perform voice input for record data and attach the memo without use of hands, i.e., without stopping the operation. By preparing and storing a suitable command dictionary in advance, the command recognition for inputting a value and attaching a memo can be performed in the information processing apparatus 1 at high speed, regardless of the network status.

Third Embodiment

When there is a memo that failed to be converted, an information processing apparatus 1 according to the third embodiment shows that there is the memo that failed to be converted and also performs reconversion of the memo data when the data is displayed or when the error can be solved. In the following, the third embodiment is described by focusing on the differences with the first embodiment.

(3-1) Configuration

Figure 15:
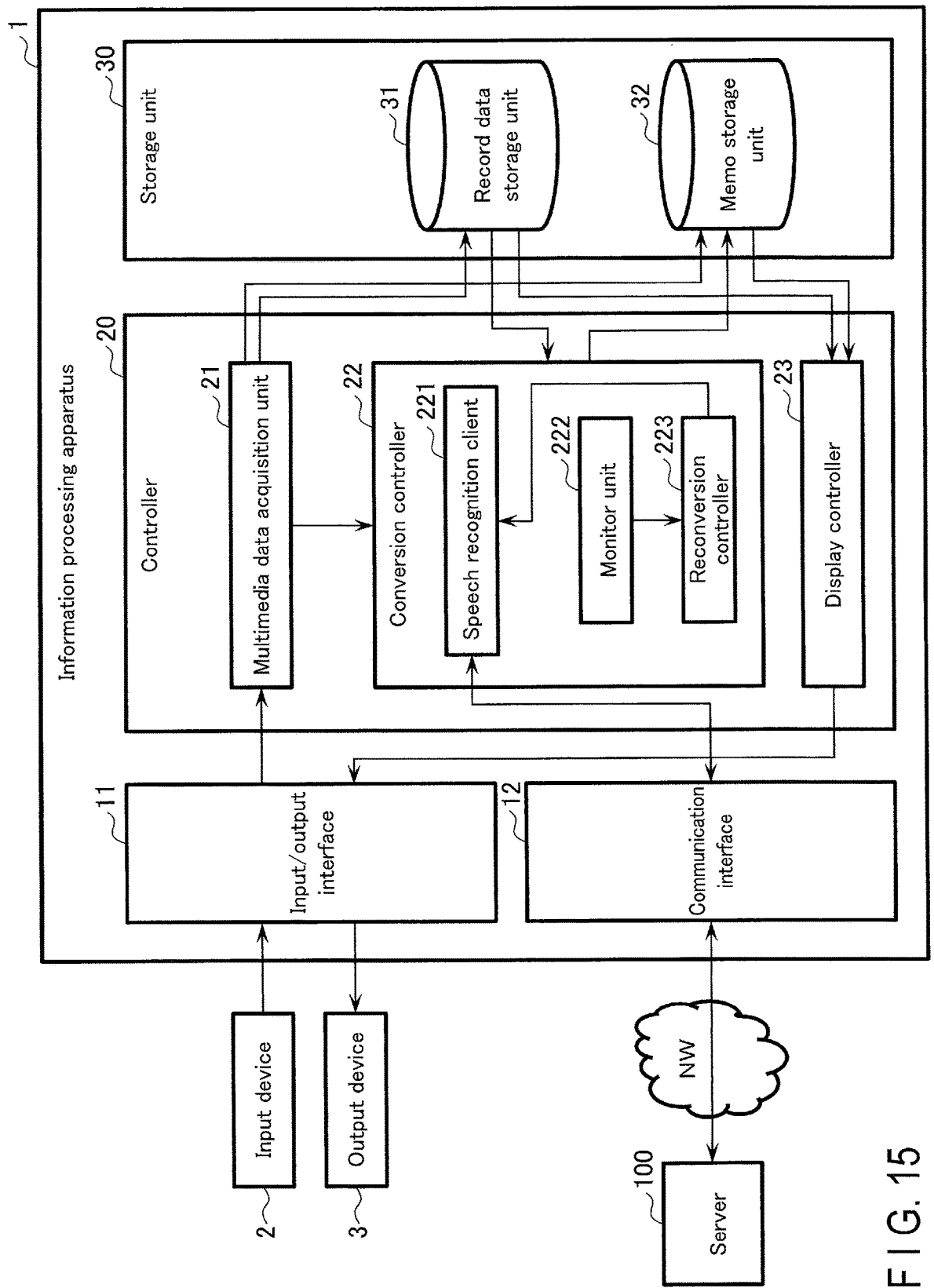
FIG. 15 is a diagram showing one example of a functional configuration of an information processing apparatus according to a third embodiment.

FIG. 15 shows a functional configuration of the information processing apparatus 1 according to the third embodiment. For structures similar to the first embodiment, the same reference numerals are added and detailed descriptions thereof are omitted. Further, the same configuration as the hardware configuration of the first embodiment is adopted.

The information processing apparatus 1 according to the third embodiment comprises an input/output interface 11, a communication interface 12, a controller 20, and a storage unit 30, which are similar to those of the first embodiment.

The controller 20 of the information processing apparatus 1 according to the third embodiment comprises a multimedia data acquisition unit 21, a conversion controller 22 and a display controller 23 similarly to the first embodiment. The conversion controller 22, in addition to the speech recognition client 221, further comprises a monitor unit 222 and a reconversion controller 223.

The monitor unit 222 monitors the presence or absence of conversion failure data in memo management data stored in a memory storage unit 32 as a first monitor unit. The monitor unit 222 also monitors a state of communication between the speech recognition client 221 and a server 100 as a second monitor unit.

The reconversion controller 223 instructs the speech recognition client 221 to reconvert data after receiving the result of monitoring by the monitor unit 222.

(3-2) Operation

The information processing apparatus 1 according to the third embodiment performs the processes of importing, adding, converting, and displaying the memo in a similar manner as the first embodiment.

The information processing apparatus 1 of the third embodiment further executes the following reconversion process at an optional timing.

(3-2-1) Memo Reconversion Process 1

The information processing apparatus 1 according to the third embodiment performs the memo reconversion process 1 as a first example. The memo reconversion process 1 is performed at a timing when a memo that failed to be converted may have the possibility of being converted successfully by retrying the conversion of the data of the conversion failed memo. The above timing may be, for example, a timing when reopening the forms data after once closed and a timing when the network connection status changes.

Figure 16:
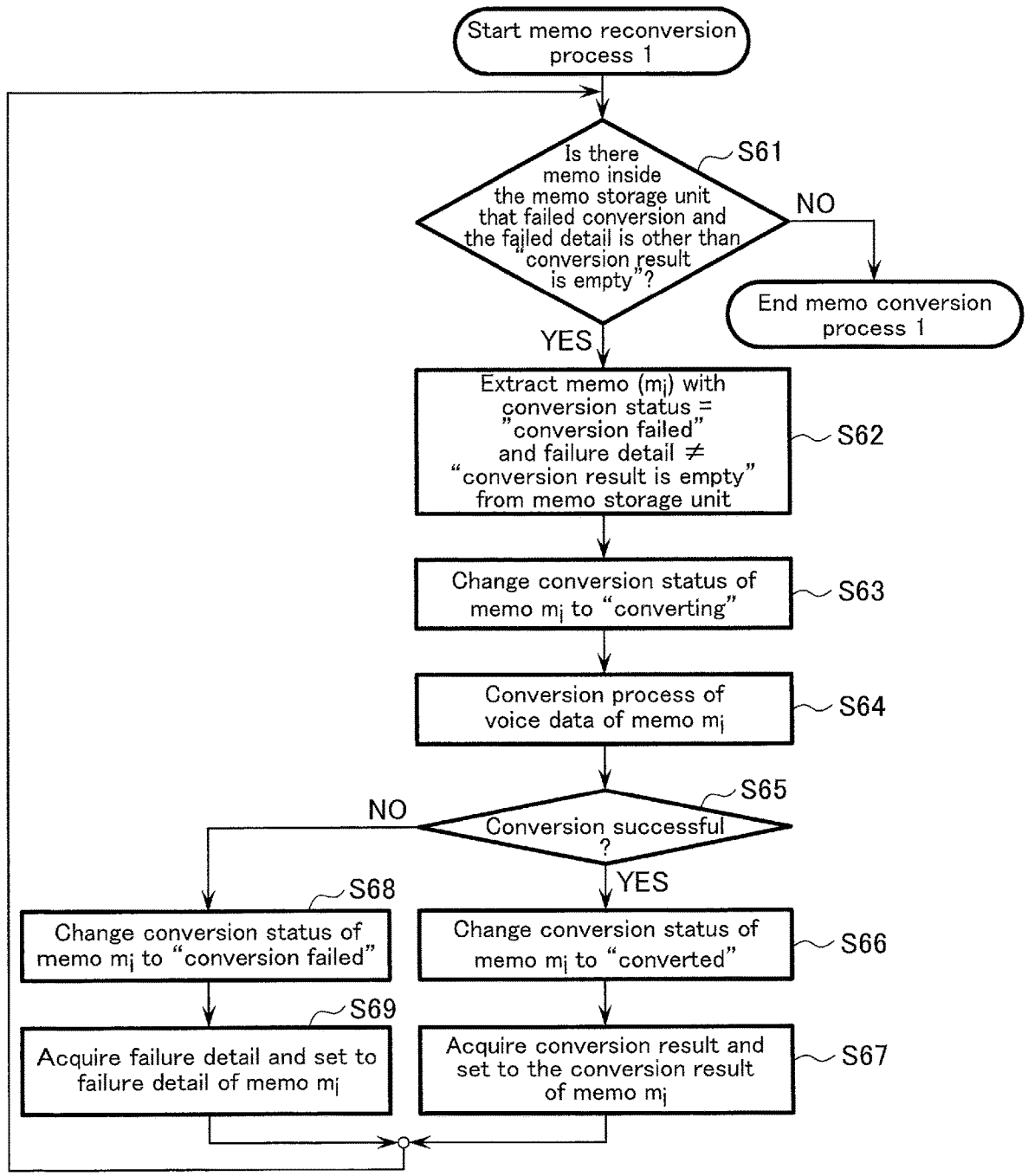
FIG. 16 is a flowchart showing a first example of a reconversion process by the information processing apparatus according to the third embodiment.

FIG. 16 shows one example of the process of the memo reconversion process 1. This example explains a reconversion process at the timing of opening the forms data.

Firstly, in step S61, the information processing apparatus 1, at the timing of opening the forms data, under the control of the monitor 222, determines whether there is a memo data in which the conversion status is "conversion failed" and a failure detail being a matter other than "conversion result is empty" stored in the memo storage unit 32. When the speech recognition result is empty, it is meaningless to perform the reconversion process due to anything wrong with the voice data (it is necessary to record the voice memo once again). If there is no memo that corresponds to the condition of step S61 (NO), the process is terminated.

When there is a corresponding memo (YES), in step S62, the memo data is extracted from the memo storage unit 32 and passed on to the speech recognition client 221 under the control of the reconstruction unit 223.

In the following process, a similar process (steps S163 to S169) explained in reference to FIG. 5 of the first embodiment is adopted. In step S63, the conversion status of memo $m_i$ in the memo management data is changed to "converting." In step S64, the conversion controller 22, under the control of the speech recognition client 221, starts the conversion process of the voice data attached to memo $m_i$. In step S65, the conversion controller 22 determines whether the conversion (speech recognition) was successful or not. If the conversion is successful (YES), the process proceeds to step S66. In step S66, the conversion controller 22 changes the conversion status of memo $m_i$ in the memo management data stored in the memo storage unit 32 to "converted." Next, in step S67, the conversion controller 22 stores a text of speech recognition result in the conversion results of memo $m_i$ in the memo management data. On the other hand, in step S65, when it is determined that the conversion has failed (NO), the process proceeds to step S68. In step S68, the conversion controller 22 changes the conversion status of memo $m_i$ in the memo management data stored in the memo storage unit 32 to "conversion failed." In step S69, the conversion controller 22 sets the determined failure detail to the failure detail of the memo $m_i$ in the memo management data.

After completing step S67 or S69, the process once again returns to step S61. In step S61, if there are multiple unconverted memos, the conversion order is in chronological order of oldest memo first. The memo that once failed to be reconverted is not set to be a target of reconversion until the forms data is closed and reactivated, until a predetermined condition is fulfilled or until a predetermined time passes.

(3-2-2) Memo Reconversion Process 2

The information processing apparatus 1 according to the third embodiment performs a memo reconversion process 2 as a second example. The memo reconversion process 2 is performed at a timing when the network connection status changes.

Figure 17:
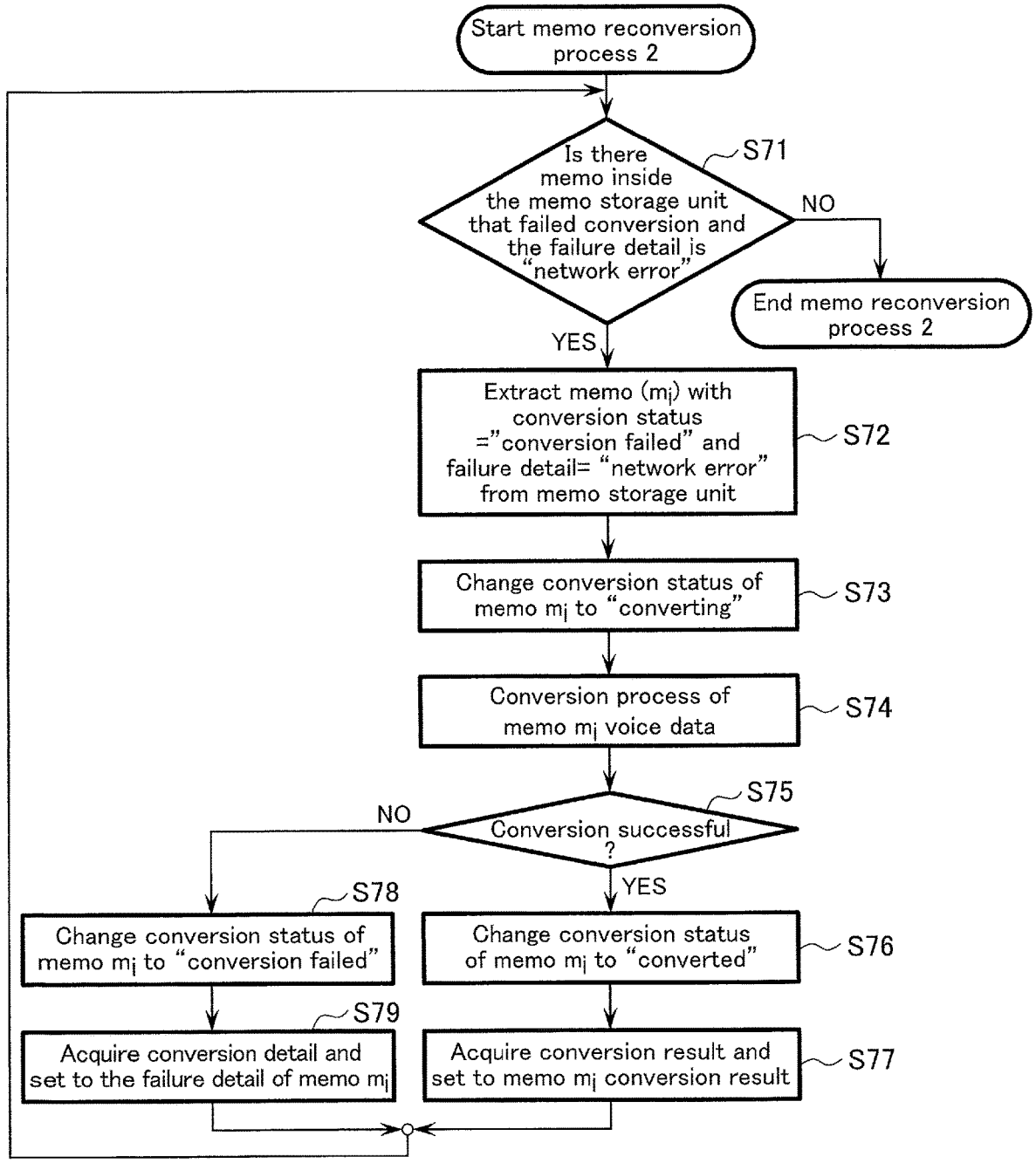
FIG. 17 is a flowchart showing a second example of the reconversion process by the information processing apparatus according to the third embodiment.

FIG. 17 shows one example of a process of the memo conversion process 2. In this example, the reconversion process at a timing when a network connection status between the recognition client 221 and the server 100 changes as a result of monitoring by the monitor unit 222 is explained.

In step S71, the reconversion controller 223 determines whether or not there is a memo with a conversion status of "conversion failed" and the failure detail being an error related to the network from the memo storage unit 32. If there is no memo that corresponds to the condition of step S71 (NO), the process is terminated.

If there is a corresponding memo (YES), in step S72, the corresponding memo $m_i$ is extracted from the memo storage unit 32 and passed on to the speech recognition client 221 under the control of the reconstruction unit 223.

In the following process, similar processes as those explained in the first example (memo reconversion process 1) are adopted. In step S73, the conversion status of memo $m_i$ in the memo management data is changed to "converting." In step S74, the conversion controller 22, under the control of the speech recognition client 221, starts the conversion process of the voice data attached to memo $m_i$. In step S75, the conversion controller 22 determines whether the conversion (speech recognition) is successful or not. If the conversion is successful (YES), the process proceeds to step S76. In step S76, the conversion controller 22 changes the conversion status of memo $m_i$ in the memo management data stored in the memo storage unit 32 to "converted." Next, in step S77, the conversion controller 22 sets a text of speech recognition result in the conversion result of the memo $m_i$ in the memo management data. On the other hand, in step S75, when the conversion fails (NO), the process proceeds to step S78. In step S78, the conversion controller 22 changes the conversion status of memo $m_i$ in the memo management data stored in the memo storage unit 32 to "conversion failed." In step S79, the conversion controller 22 sets the determined failure detail to the failure detail of the memo $m_i$ in the memo management data.

After completing step S77 or S79, the process once again returns to step S71. In step S71, if there are multiple unconverted memos, the conversion order is in chronological order of oldest memo first. The memo that once failed to be reconverted is not set to be a target of reconversion until a predetermined condition is fulfilled or until a predetermined time passes.

(3-3) Effect

As explained above, the information processing apparatus 1 according to the third embodiment, in addition to the first embodiment, automatically attempts to reconvert the memo which failed to be converted in the memo reconversion process 1 or the reconversion process 2, when predetermined conditions are met. Thus, there is a possibility that the conversion result may be automatically acquired even with the memo that failed to be converted once without involving the use of hands by the user, and the usability can be enhanced.

Further, in the third embodiment, the voice memo is automatically reconverted and its contents become browsable at the timing when the network status changes, for example, when a tablet PC which is the information processing apparatus 1 moves to a different location and becomes connected to the wireless network.

In addition, the reconversion process may be automatically performed or the operator may be asked whether to perform the reconversion process.

Fourth Embodiment

An information processing apparatus 1 according to the fourth embodiment comprises a voice memo attachment function similar to the first embodiment, includes a conversion priority for each memo and configured to perform conversion from an order of a memo with high priority. In the following, the fourth embodiment is described by focusing on the difference with the first embodiment.

(4-1) Configuration

The information processing apparatus 1 according to the fourth embodiment comprises the same functional configuration and hardware configuration as the first embodiment as shown in FIGS. 1 and 2.

In the fourth embodiment, a memo storage unit 32 includes information for designating the memo conversion priority in addition to memo management data 55 in the first embodiment.

Figure 18:
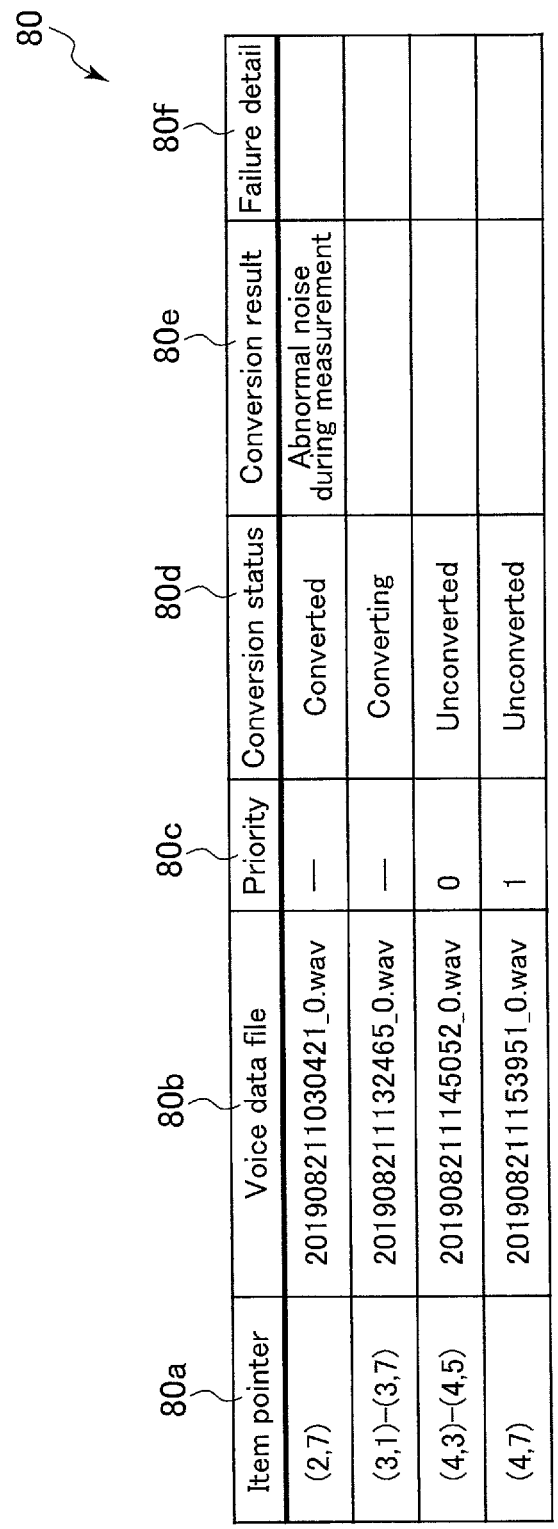
FIG. 18 is a diagram showing one example of memo management data according to a fourth embodiment.

FIG. 18 shows one example of memo management data 80 according to the fourth embodiment. The memo management data 80 corresponds to one memo per row and as the item names, includes an "item pointer" $80a$, a "voice data file" $80b$, a "priority" $80c$, a "conversion status" $80d$, a "conversion result" $80e$, and a "failure detail" $80f$.

Like the memo management data 55, the item pointer $80a$ shows the pointer to the item to which the memo is attached, the voice data file $80b$ shows the pointer to the multimedia data, the conversion status $80d$ shows the conversion status of memo, the conversion result $80e$ shows a result when the memo conversion is successful, and the failure detail $80f$ shows a failed matter when the memo conversion has failed.

On the other hand, in the memo management data 80, the priority $80c$ shows a level of priority of conversion by the conversion controller 22. The value of the priority $80c$ is stored in memos beside the memos with the conversion status of "converted" or "converting" and the initial value is 0.

(4-2) Operation

The information processing apparatus 1 according to the fourth embodiment performs a similar operation as explained in reference to FIGS. 3-5 of the first embodiment. However, in step S162 of the flowchart shown in FIG. 5, when retrieving one memo from the memo storage unit 32, a memo with a conversion status of unconverted and the highest priority value is retrieved. If there are multiple memos with the same priority value, the conversion may be conducted in chronological order from the oldest memo.

The value of the priority $80c$ is stored as initial value 0 at the time when the memo is attached. The value of priority can be suitably changed by an operation of the user who attached the memo or the user who viewed the record data. For example, when there are multiple unconverted memos, the user performs operation of selecting the memo by tapping the memo area 61 displayed on the touch screen in order to increase the conversion priority of the selected memo.

Figure 19:
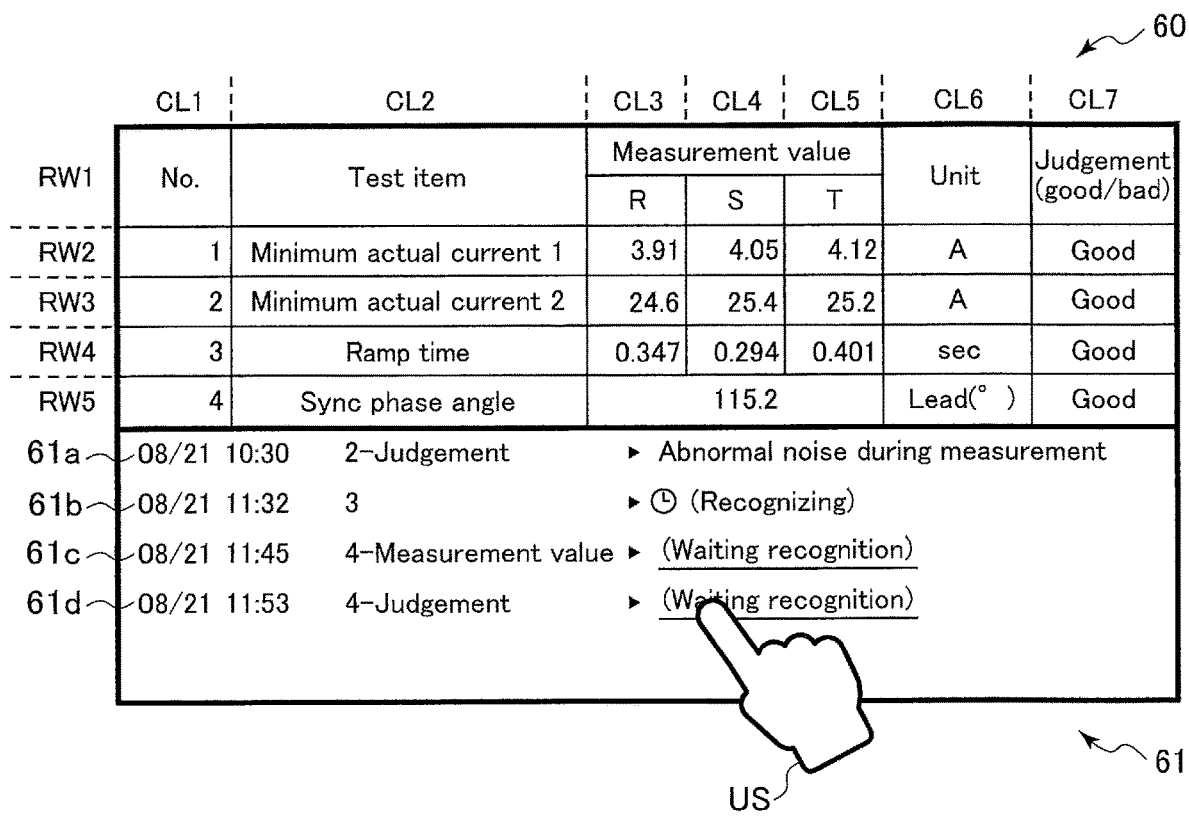
FIG. 19 is a diagram showing one example of a memo priority change according to the fourth embodiment.

FIG. 19 shows one example of such a memo priority change. Like the first embodiment, the record data area 60 and the memo area 61 are displayed as a memo view. The memo area 61 displays an unconverted ("waiting recognition") memos as being capable of being tapped. When one of these memos is tapped by the user US, the priority of the corresponding memo in the management data 80 stored in the memo storage unit 32 increases by +1. When the same memo is tapped multiple times by the user US, the priority increases by the number of times the memo was tapped. Changing the priority is not limited to the above and other methods including a voice command may be adopted.

(4-3) Effect

As explained above, the information processing apparatus 1 according to the fourth embodiment, in addition to the first embodiment, sets a priority for each memo and performs conversion in the order of the highest priority memo first. Therefore, when the user wishes to check the content of the memo immediately, he/she can raise the priority of conversion by a simple operation. The user may check for the content of the memo to be checked without waiting for the recognition of other memos to be over.

According to the information processing apparatus and the information process method of at least one embodiment described above, a content of a memo attached to the record data can be seen at first glance and when the content of the memo is not displayed, its cause may be predicted.

OTHER EMBODIMENTS

The present invention is not limited to the above embodiment. More specifically, the data conversion process by the conversion controller 22 is not necessarily performed by an online server and all conversion processes may be performed within the conversion controller 22. In addition, the memo conversion order does not need to be performed in chronological order of oldest memo first, and may be performed depending on the type or size of the multimedia data attached as a memo. The conversion priority may be set automatically by the system without being dependent on the operation of the user US.

Each function unit comprised by the information processing apparatus 1 is distributively arranged to a plurality of apparatuses and processes may be performed by coordinating these apparatuses with each other. In addition, each function unit may be achieved by using circuits. The circuits may be dedicated circuits for achieving a specific function, or a general-purpose circuit such as a processor. Similarly, a part of the storage unit 30 may be separate from the information processing apparatus 1.

More specifically, the record data storage unit 31 may be provided with another apparatus communicable with the information processing apparatus 1 via the network. In addition, the flow of each process explained above is not limited to the explained procedure, and the order of some steps may be replaced and some steps may be performed simultaneously. Further, there is no need to temporally execute the series of processes explained above consecutively, and each step may be executed at an optional timing. For example, the flowchart shown in FIG. 3 is only shown to provide an overview of the process according to the information processing apparatus 1, and there is no need to consecutively execute each step chronologically.

The above procedure is stored as a program (software means) which can be executed by a calculator (computer) in a recording medium (storage medium) such as a magnetic disk (floppy (registered trademark) disk, hard disk, etc.), an optical disk (CD-ROM, DVD, MO, etc.), a semiconductor memory (ROM, RAM, flash memory, etc.), etc., and may be transmitted and distributed by a communication medium. Further, the program stored in the medium includes a setup program configured in the calculator for executing software means (including table and data as well as an execution program) to the calculator. The calculator for achieving the above apparatus reads a program recorded on the recording medium, or constructs software means by the setup program where applicable, and executes the above process by controlling the operation by the software means. Further, the recording medium described in the present specification is not limited to a storage medium to be used for distribution and may include a storage medium such as a magnetic disk and a semiconductor memory provided within the calculator or equipment connected to the calculator via the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
    a first acquisition unit configured to acquire multimedia data associated with an item of record data having a plurality of items;
    a conversion unit configured to perform a conversion process from the multimedia data to first display data showing a content of the multimedia data;
    a display controller configured to display the first display data when the conversion process is completed, and second display data showing a progress status of the conversion process when the conversion process is incomplete in association with the item of the record data;
    a specifying unit configured to specify an input target item out of the plurality of items of the record data;
    a second acquisition unit configured to acquire voice data associated with the input target item; and
    a command recognition unit configured to recognize a voice command relating to an acquisition of the multimedia data or character information relating to a value to be inputted to the input target item,
    wherein the command recognition unit instructs a start of acquisition of the multimedia data to the first acquisition unit when the voice command from the voice data is recognized, and outputs the character information as an input value to the input target item when the character information from the voice data is recognized.

2. The apparatus according to claim 1, wherein the display controller displays, as the second display data, data showing that the conversion process is unimplemented, the conversion process is currently underway, or the conversion process failed.

3. The apparatus according to claim 1, wherein the multimedia data is any of voice data, still image data, or video data or a combination thereof.

4. The apparatus according to claim 1, wherein the conversion unit outputs information concerning a reason of failure when the conversion process fails, and
    the display controller further displays the second display data along with the information concerning the reason of failure.

5. An information processing apparatus, comprising:
    a first acquisition unit configured to acquire multimedia data associated with an item of record data having a plurality of items;
    a conversion unit configured to perform a conversion process from the multimedia data to first display data showing a content of the multimedia data;
    a display controller configured to display the first display data when the conversion process is completed, and second display data showing a progress status of the conversion process when the conversion process is incomplete in association with the item of the record data; and
    a first storage unit configured to store information showing a result of a conversion process by the conversion unit linked with identification information of an item associated with the multimedia data,
    the conversion unit further comprising:
    a first monitor unit configured to monitor information stored in the first storage unit, and
    a reconversion instruction unit configured to instruct to retry the conversion process using corresponding multimedia data when information showing a result of the conversion process fulfills a predefined condition.

6. The apparatus according to claim 5, wherein the conversion unit further comprises:
    a conversion client unit configured to cause a conversion server connected via a network to perform a part of the conversion process, and
    a second monitor unit configured to monitor a status of communication between the conversion client unit and the conversion server,
    the reconversion instruction unit instructs to retry the conversion process using the corresponding multimedia data when the information indicates that failure of the conversion process originates in a communication error as a result of monitoring by the first monitoring unit and when the status of the communication changes as a result of the monitoring by the second monitoring unit.

7. An information processing apparatus, comprising:
    a first acquisition unit configured to acquire multimedia data associated with an item of record data having a plurality of items;
    a conversion unit configured to perform a conversion process from the multimedia data to first display data showing a content of the multimedia data;
    a display controller configured to display the first display data when the conversion process is completed, and second display data showing a progress status of the conversion process when the conversion process is incomplete in association with the item of the record data; and a second storage unit configured to store information for identifying the multimedia data, and priority information showing a level of priority of the conversion process of the multimedia data,
wherein the conversion unit performs the conversion process in order of multimedia data with high priority by reading the priority information stored in the second storage unit when there are a plurality of multimedia data that are a subject of conversion process, and
the priority information stored in the second storage unit being updated depending on a user input to the display of the second display data.

8. The apparatus according to claim 1, wherein the conversion unit, from the multimedia data, performs the conversion process to text data showing a voice recognition result from voice data included in the multimedia data, text data showing a character recognition result from image data included in the multimedia data, text data showing a character recognition result from image data included in the multimedia data, text data showing a feature extracted from image data included in the multimedia data, or text data showing a feature extracted from video data included in the multimedia data.

9. An information processing method performed by an information processing apparatus, the method comprising:
acquiring multimedia data associated with an item of record data having a plurality of items;
performing a conversion process from the multimedia data to first display data showing a content of the multimedia data;
displaying the first display data when the conversion process is completed and a second display data showing a progress status of the conversion process when the conversion process is incomplete in association with the item of the record data;
specifying an input target item out of the plurality of items of the record data;
acquiring voice data associated with the input target item; and
recognizing a voice command relating to an acquisition of the multimedia data or character information relating to a value to be inputted to the input target item,
wherein recognizing the voice command instructs a start of acquisition of the multimedia data when the voice command from the voice data is recognized, and outputs the character information as an input value to the input target item when the character information from the voice data is recognized.

10. A non-transitory computer readable medium including computer executable instructions, wherein the instructions, when executed by a processor, cause the processor to perform a method comprising:
acquiring multimedia data associated with an item of record data having a plurality of items;
performing a conversion process from the multimedia data to first display data showing a content of the multimedia data;
displaying the first display data when the conversion process is completed and a second display data showing a progress status of the conversion process when the conversion process is incomplete in association with the item of the record data;
specifying an input target item out of the plurality of items of the record data;
acquiring voice data associated with the input target item; and
recognizing a voice command relating to an acquisition of the multimedia data or character information relating to a value to be inputted to the input target item,
wherein recognizing the voice command instructs a start of acquisition of the multimedia data when the voice command from the voice data is recognized, and outputs the character information as an input value to the input target item when the character information from the voice data is recognized.

11. An information processing apparatus comprising:
a first acquisition unit configured to acquire multimedia data associated with an item of record data having a plurality of items;
a conversion unit configured to perform a conversion process from the multimedia data to first display data showing a content of the multimedia data;
a display controller configured to display the first display data when the conversion process is completed, and second display data showing a progress status of the conversion process when the conversion process is incomplete in association with the item of the record data; and
a command recognition unit configured to recognize a voice command relating to an acquisition of the multimedia data or character information relating to a value to be inputted to an input target item,
wherein the command recognition unit instructs a start of acquisition of the multimedia data to the first acquisition unit when the voice command from a voice data is recognized, the voice data being associated with the input target item, the input target item being specified out of the plurality of items of the record data, and the command recognition unit outputs the character information as an input value to the input target item when the character information from the voice data is recognized.

* * * * *